US012804728B2

(12) United States Patent
Krishnamurthy et al.

(10) Patent No.: US 12,804,728 B2
(45) Date of Patent: Nov. 17, 2026

(54) POSTPONEMENT IN CONTENTION-BASED TRANSMISSION OCCASION GROUPS

(71) Applicant: QUALCOMM Incorporated, San Diego, CA (US)

(72) Inventors: Harikumar Krishnamurthy, San Diego, CA (US); Ayan Sengupta, San Diego, CA (US); Alberto Rico Alvarino, San Diego, CA (US); Syed Hashim Ali Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 18/886,349

(22) Filed: Sep. 16, 2024

(65) Prior Publication Data

US 2026/0082431 A1 Mar. 19, 2026

(51) Int. Cl.
*H04W 74/0833* (2024.01)

(52) U.S. Cl.
CPC ................................ *H04W 74/0841* (2013.01)

(58) Field of Classification Search
CPC ........... H04W 74/0808; H04W 74/006; H04W 74/0816; H04W 74/0866; H04W 72/23; H04B 7/06952; H04B 7/088; H04L 1/1854; H04L 1/1864; H04L 5/0053; H04L 5/0094; H04L 1/1671
See application file for complete search history.

(56) References Cited

U.S. PATENT DOCUMENTS

2022/0131652 A1* 4/2022 Bae ........................ H04L 1/1642
2023/0048297 A1 2/2023 Lee et al.
2023/0199827 A1* 6/2023 Xu ........................ H04L 1/1854
370/329
2023/0396984 A1 12/2023 Shrivastava et al.
2024/0073765 A1 2/2024 Shrivastava
2024/0172139 A1* 5/2024 Wu ........................... H04L 5/14
2024/0179773 A1 5/2024 Yamamoto et al.
2026/0046903 A1* 2/2026 Lee ........................ H04L 1/1854

OTHER PUBLICATIONS

International Search Report and Written Opinion—PCT/US2025/044490—ISA/EPO—Dec. 9, 2025.

* cited by examiner

*Primary Examiner* — Rushil P. Sampat
(74) *Attorney, Agent, or Firm* — Holland & Hart LLP

(57) ABSTRACT

Methods, systems, and devices for wireless communications are described. A user equipment (UE) may receive a configuration for a group of transmission occasions (TOs) that includes two or more TOs, each TO in the group of TOs including a set of resources shared by one or more UEs for contention-based data or access signal transmissions. The UE may perform at least one data or access signal transmission in a first TO in the group of TOs using a resource from the set of resources. The start time of the first TO may be in accordance with the presence of a transmission gap in a prior TO of the group of TOs. For example, a transmission gap may be caused by the presence of an overlapping narrowband physical random access channel resource or an uplink gap for UEs to synchronize timing with downlink communications.

20 Claims, 16 Drawing Sheets

| | TO1 305 | TO2 310 | TO3 315 |
|---|---|---|---|
| P1/D1 320 | D | C,F | B |
| P2/D2 325 | | H | |
| P3/D3 330 | | E | A,G,I |
| P4/D4 335 | H | L | E,J |
| P5/D5 340 | F,L | K | C |
| P6/D6 345 | B | A,G,J | |
| P7/D7 350 | | I | D |
| P8/D8 355 | K | | |

300

FIG. 3

POSTPONEMENT IN CONTENTION-BASED TRANSMISSION OCCASION GROUPS

FIELD OF TECHNOLOGY

The following relates to wireless communications, including postponement in contention-based transmission occasion groups.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a user equipment (UE) is described. The method may include receiving a configuration for a group of transmission occasions (TOs) including two or more TOs, each TO in the group of TOs including a set of resources shared by a set of multiple UEs for contention-based data or access signal transmissions and performing a data or access signal transmission in a first resource of the set of resources and a first TO of the group of TOs, where a start time of the first TO is in accordance with a presence of a transmission gap in a second TO of the group of TOs, the second TO immediately prior to the first TO within the group of TOs.

A UE for wireless communications is described. The UE may include one or more memories storing processor executable code, and one or more processors coupled with the one or more memories. The one or more processors may individually or collectively be operable to execute the code to cause the UE to receive a configuration for a group of TOs including two or more TOs, each TO in the group of TOs including a set of resources shared by a set of multiple UEs for contention-based data or access signal transmissions and perform a data or access signal transmission in a first resource of the set of resources and a first TO of the group of TOs, where a start time of the first TO is in accordance with a presence of a transmission gap in a second TO of the group of TOs, the second TO immediately prior to the first TO within the group of TOs.

Another UE for wireless communications is described. The UE may include means for receiving a configuration for a group of TOs including two or more TOs, each TO in the group of TOs including a set of resources shared by a set of multiple UEs for contention-based data or access signal transmissions and means for performing a data or access signal transmission in a first resource of the set of resources and a first TO of the group of TOs, where a start time of the first TO is in accordance with a presence of a transmission gap in a second TO of the group of TOs, the second TO immediately prior to the first TO within the group of TOs.

A non-transitory computer-readable medium storing code for wireless communications is described. The code may include instructions executable by one or more processors to receive a configuration for a group of TOs including two or more TOs, each TO in the group of TOs including a set of resources shared by a set of multiple UEs for contention-based data or access signal transmissions and perform a data or access signal transmission in a first resource of the set of resources and a first TO of the group of TOs, where a start time of the first TO is in accordance with a presence of a transmission gap in a second TO of the group of TOs, the second TO immediately prior to the first TO within the group of TOs.

In some examples of the method, UEs, and non-transitory computer-readable medium described herein, receiving the configuration may include operations, features, means, or instructions for receiving an indication of a periodicity for respective start times of the two or more TOs, where the periodicity may be in accordance with the presence of the transmission gap in the second TO.

In some examples of the method, UEs, and non-transitory computer-readable medium described herein, receiving the configuration may include operations, features, means, or instructions for receiving an indication of a first start time of a temporally first TO of the group of TOs and an indication of respective offsets between respective start times of each subsequent TO of the group of TOs, where the start time of the first TO may be in accordance with the presence of the transmission gap based on a respective offset between a respective start time of the second TO and the start time.

In some examples of the method, UEs, and non-transitory computer-readable medium described herein, receiving the configuration may include operations, features, means, or instructions for receiving an indication of a first start time of a temporally first TO of the group of TOs and an indication of respective offsets between respective nominal end times and respective start times of each subsequent TO of the group of TOs, where the start time of the first TO may be in accordance with the presence of the transmission gap based on a respective offset between a respective nominal end time of the second TO and the start time.

In some examples of the method, UEs, and non-transitory computer-readable medium described herein, receiving the configuration may include operations, features, means, or instructions for receiving an indication of a nominal duration for the two or more TOs, where the respective nominal end times may be in accordance with the first start time and the nominal duration.

Some examples of the method, UEs, and non-transitory computer-readable medium described herein may further include operations, features, means, or instructions for receiving scheduling information for a physical random access channel resource or that may be indicative of an uplink gap, detecting, based on the scheduling information and the configuration, an overlap between the physical random access channel resource or the uplink gap and one or more resources of the set of resources in the second TO, where the transmission gap includes the overlap, and calculating the start time based on detection of the overlap.

Some examples of the method, UEs, and non-transitory computer-readable medium described herein may further include operations, features, means, or instructions for calculating, based on a nominal duration of the two or more TOs, a nominal start time of the first TO, calculating, based on detection of the transmission gap and based on the configuration, a worst case start time of the first TO, and selecting the worst case start time as the start time based on the worst case start time being later than the nominal start time.

In some examples of the method, UEs, and non-transitory computer-readable medium described herein, calculating the worst case start time may include operations, features, means, or instructions for adding an additional offset to a second worst case start time, the second worst case start time based on detection of the transmission gap and based on the configuration.

In some examples of the method, UEs, and non-transitory computer-readable medium described herein, performing the data or access signal transmission may include operations, features, means, or instructions for puncturing a portion of the data or access signal transmission during a second transmission gap in the first TO.

Some examples of the method, UEs, and non-transitory computer-readable medium described herein may further include operations, features, means, or instructions for puncturing the portion of the data or access signal transmission during the second transmission gap may be based on a duration of the second transmission gap being less than a threshold duration.

In some examples of the method, UEs, and non-transitory computer-readable medium described herein, performing the data or access signal transmission may include operations, features, means, or instructions for transmitting a first portion of the data or access signal transmission prior to a second transmission gap in the first TO and transmitting a remainder of the data or access signal transmission after the second transmission gap.

In some examples of the method, UEs, and non-transitory computer-readable medium described herein, performing the data or access signal transmission may include operations, features, means, or instructions for transmitting a first portion of the data or access signal transmission prior to a second transmission gap in the first TO, transmitting a second portion of the data or access signal transmission after the second transmission gap, and puncturing a remainder of the data or access signal transmission that exceeds a maximum TO duration.

In some examples of the method, UEs, and non-transitory computer-readable medium described herein, the maximum TO duration may be based on a nominal start time of a subsequent TO, an offset or nominal end time of the first TO plus an offset, or a combination thereof.

Some examples of the method, UEs, and non-transitory computer-readable medium described herein may further include operations, features, means, or instructions for monitoring a response window for a response message for the data or access signal transmission, where the response window may be associated with the first TO.

In some examples of the method, UEs, and non-transitory computer-readable medium described herein, a timing of the response window may be in accordance with the presence of the transmission gap.

Some examples of the method, UEs, and non-transitory computer-readable medium described herein may further include operations, features, means, or instructions for monitoring a response window for a response message for the data or access signal transmission, where the response window may be associated with the group of TOs.

In some examples of the method, UEs, and non-transitory computer-readable medium described herein, a timing of the response window may be in accordance with the presence of the transmission gap.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 3 shows an example of a TO group that supports postponement in contention-based TO groups in accordance with one or more aspects of the present disclosure.

DETAILED DESCRIPTION

Figure 1:
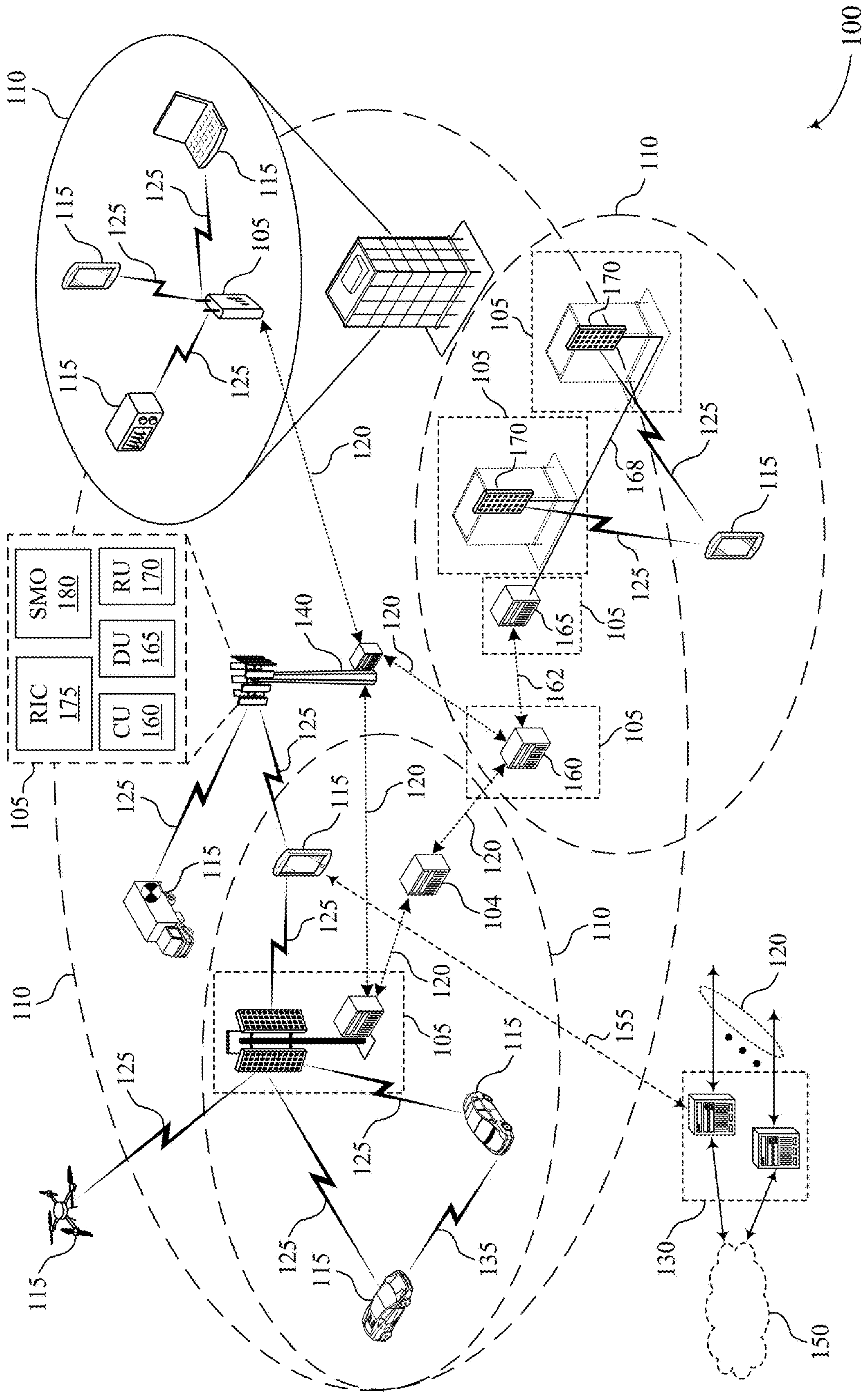
FIG. 1 shows an example of a wireless communications system that supports postponement in contention-based transmission occasion (TO) groups in accordance with one or more aspects of the present disclosure.

Wireless networks may configure physical random-access channel (PRACH) resources during a random-access channel (RACH) occasion (e.g., a transmission occasion (TO) for a RACH preamble or data transmission) for a user equipment (UE) to initiate a RACH procedure or to perform a RACH-less early data transmission (EDT) using the PRACH resources in the RACH occasion. The PRACH resources may be generally shared resources available to any UE configured to initiate the RACH procedure or to send the EDT to the network. For example, each UE may randomly select one of the PRACH resources (e.g., preambles) to send an access signal to the network according to the PRACH configuration. However, in some examples multiple UEs may select the same resource and transmit access signals to the network during the RACH occasion. But multiple UEs selecting the same resource may result in a collision of the access signal transmissions. To increase the chance of successful transmission, the network may configure multiple TOs, and each UE may transmit multiple repetitions of the RACH message or the EDT via the multiple TOs. Start times of TOs may be aligned in time such that the network entity may correctly decode transmissions from the UEs. In some cases, transmissions within a TO may be delayed due to a transmission gap. A transmission gap may refer to a time gap in a transmission by a UE during a TO such that the transmission is completed in at least two parts separated by the transmission gap. For example, a transmission gap may occur within a TO if a narrowband PRACH (NPRACH) resource overlaps with resources in a TO or due to an uplink gap for half-duplex UEs. For example, a half-duplex UE may have a maximum uplink transmission duration before switching to downlink to synchronize downlink timing. The period of time during which the half-duplex UE switches to downlink to synchronize downlink timing may be referred to as an uplink gap. If a half-duplex UE transmits in consecutive TOs that abut in time (e.g., the start time of the subsequent TO is the same as the end time of the prior TO), the transmission time across the consecutive TOs may exceed the maximum uplink transmission duration, resulting in an uplink gap, and therefore a transmission gap. If a transmission gap occurs, transmissions within a first TO may leak into a second TO, which may disrupt reception of RACH messages or EDTs at the network entity.

The start time of a TO after a prior TO that included a transmission gap may account for the transmission gap in the prior TO. Accordingly, each UE (of multiple UEs) that transmits in a particular TO may initiate transmission at the same time. For example, the network entity may be aware of the presence of transmission gaps, and accordingly may schedule TOs within a group of TOs with a periodicity that accounts for the presence of the transmission gaps. As another example, the network entity may indicate offsets between each TO in a TO group that account for transmission gaps in the TOs. As another example, the UEs may identify the presence of transmission gaps (e.g., based on consecutive TOs without gaps between the TOs or based on the presence of NPRACH resources) in one or more TOs, and the UEs may identify start times of the TOs within a group of TOs based on the identified transmission gaps.

Aspects of the disclosure are initially described in the context of wireless communications systems. Aspects of the disclosure are further illustrated by and described with reference to TO group diagrams, transmission timing diagrams, TO timing diagrams, diagrams of transmission timing in a TO, process flows, apparatus diagrams, system diagrams, and flowcharts that relate to postponement in contention-based TO groups.

FIG. 1 shows an example of a wireless communications system 100 that supports postponement in contention-based TO groups in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support postponement in contention-based TO groups as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive a configuration for a group of TOs that include more than one TO, and each TO in the group of TOs may include a set of resources shared by multiple UEs 115 for contention-based data or access signal transmissions. The UE 115 may perform at least one data or access signal transmission in at least one TO in the group of TOs using a resource from the set of resources of the at least one TO. In some cases, transmissions within a TO may be delayed due to a transmission gap. For example, a transmission gap may occur within a TO if an NPRACH resource overlaps with resources in a TO or due to an uplink gap for half-duplex UEs 115. For example, a half-duplex UE 115 may have a maximum uplink transmission duration before switching to downlink to synchronize downlink timing. The time period during which the half-duplex UE 115 switches to downlink to synchronize downlink timing may be referred to as an uplink gap. If a half-duplex UE 115 transmits in consecutive TOs that do not have a time gap between them, the transmission time across the consecutive TOs may exceed the maximum uplink transmission duration, resulting in an uplink gap. If a transmission gap occurs, transmissions within a first TO may leak into a second TO, which may disrupt reception of RACH messages or EDTs at the network entity 105. Accordingly, the start time of a TO after a prior TO that included a transmission gap may account for the transmission gap in the prior TO. Thus, each UE 115 that transmits in a particular resource in a TO may initiate transmission at the same time.

Figure 2:
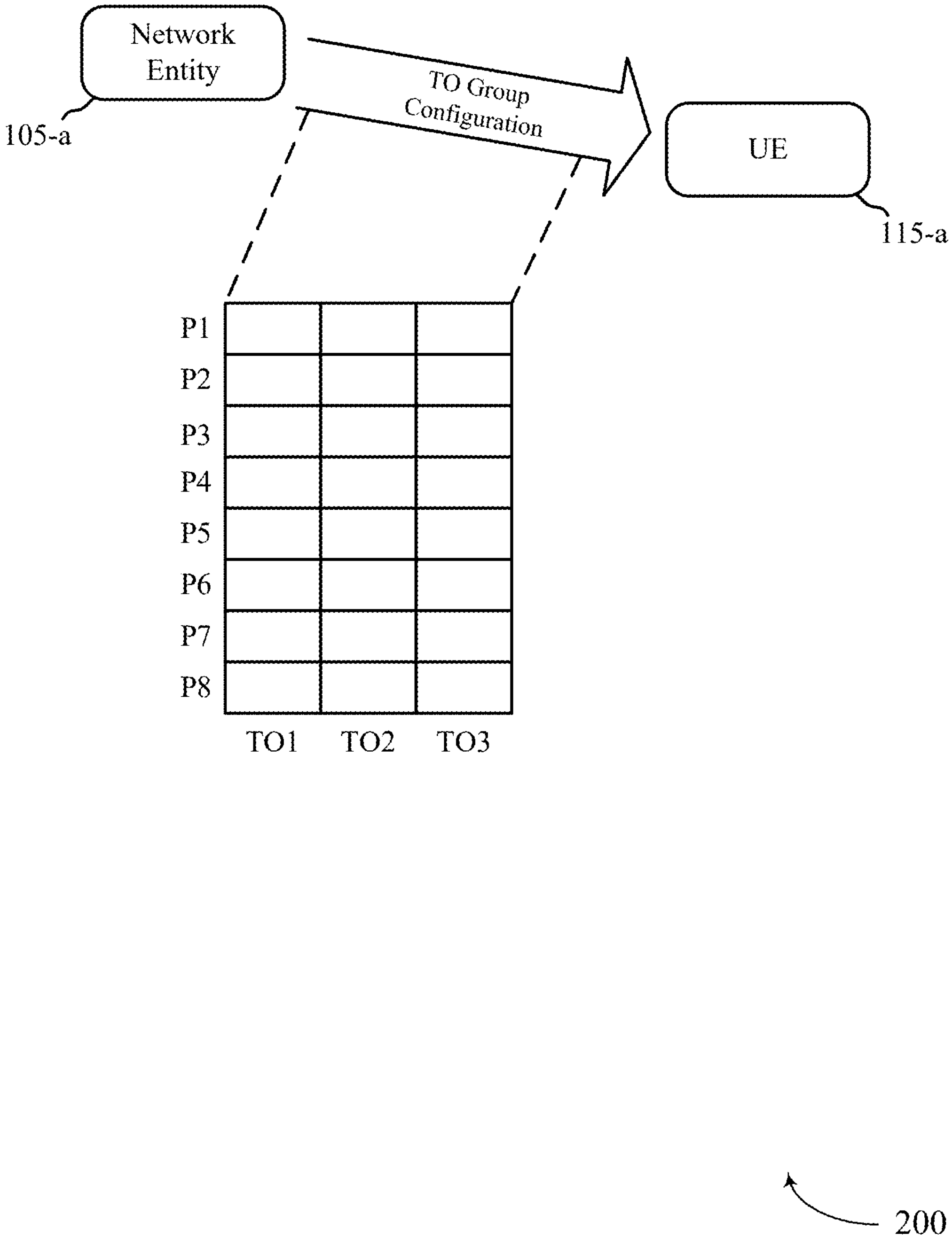
FIG. 2 shows an example of a wireless communications system that supports postponement in contention-based TO groups in accordance with one or more aspects of the present disclosure.

FIG. 2 shows an example of a wireless communications system 200 that supports postponement in contention-based TO groups in accordance with one or more aspects of the present disclosure. The wireless communications system 200 may implement or may be implemented by aspects of wireless communications system 100. The wireless communications system 200 may include a UE 115-*a* and a network entity 105-*a*, which may be examples of the corresponding devices described herein.

Wireless networks may utilize various access schemes to establish a connection between UEs 115 and the network. The access schemes may be contention-based or non-contention-based. The non-contention-based access schemes may include dedicated resources being configured for a UE 115-*a* to establish a connection to the network. The contention-based access schemes may include a pool of resources being established that are shared by all UEs 115.

As one non-limiting example, a contention-based access scheme may include a four-step RACH procedure. The four-step RACH procedure may be initiated with a UE 115-*a* transmitting a message one (Msg1) RACH preamble to the network entity 105-*a*. For example, after choosing a RACH occasion the UE 115-*a* may uniformly and randomly select a RACH preamble from a set of allowed RACH preambles. The UE 115-*a* may transmit the RACH preamble to the network that is scrambled with a random-access radio network temporary identifier (RA-RNTI). The UE 115-*a* may wait for a random-access response (RAR) message from the network. In some aspects, the Msg1 transmission may carry or otherwise convey an indication of a random-access preamble identifier (RAPID) associated with the RACH process.

The network may respond to the Msg1 transmission by transmitting the RAR in a message two (Msg2). For example, upon correctly receiving the preamble from the UE 115-*a* the network entity 105-*a* may respond with the RAPID as well as including other information for a message three (Msg3) transmission, such as a timing advance, uplink grant, and temporary cell radio network temporary identifier (C-RNTI). Or the network entity 105-*a* may respond with a backoff indication to let the UE 115-*a* know to abandon the current RACH procedure (e.g., in the situation where the network entity 105-*a* is busy).

The UE 115-*a* may respond to the Msg2 transmission from the network entity 105-*a* by transmitting the Msg3. For example, if the RAR from the network entity 105-*a* includes the RAPID transmitted in the Msg1, the UE 115-*a* may transmit the Msg3 according to the uplink grant indicted in the Msg2. In some aspects, the Msg3 may be scrambled using the temporary C-RNTI and include a contention resolution identifier/C-RNTI (e.g., if the network entity 105-*a* has already assigned a permanent C-RNTI to the UE 115-*a*).

The network entity 105-*a* may correctly receive the Msg3 and resolve any contention. The network entity 105-*a* may transmit a response (e.g., a message four (Msg4)) to the UE 115-*a* that includes the contention resolution identifier/C-RNTI of the UE 115-*a* which was successful. In some aspects, the network entity 105-*a* may also issue a retransmission of the Msg3 if required. Upon receiving the Msg4 with the matching contention resolution identifier it transmitted in Msg3, the UE 115-*a* may consider the contention resolution and the random-access procedure successful. The UE 115-*a* may promote the temporary C-RNTI to the permanent C-RNTI (e.g., if not assigned earlier). In some aspects, the UE 115-*a* may transmit an acknowledgement of the Msg4 to the network entity 105-*a*.

However, the contention-based RACH resources are shared by multiple UEs 115, which may result in a collision. For example, Table 1 below shown an example of the contention resources that may be configured according to the traditional four-step RACH procedure. In this example, eight preamble resources (P1-P8) are configured for contention-based RACH procedures that are shared by multiple UEs 115. In the non-limiting example shown in Table 1, a first UE 115 (e.g., UE1) may randomly select a sixth RACH preamble (P6) to transmit its Msg1, a second UE 115 (e.g., UE2) and a fourth UE 115 (e.g., UE4) may randomly select a seventh RACH preamble (P7) to transmit their Msg1, and a third UE 115 (e.g., UE3) may randomly select a first RACH preamble (P1) to transmit its Msg1.

TABLE 1

| | |
|---|---|
| P1 | UE3 |
| P2 | |
| P3 | |
| P4 | |
| P5 | |
| P6 | UE1 |
| P7 | UE2, UE4 |
| P8 | |

Accordingly, Table 1 shows an example where two (or more, in some examples) UEs 115 select the same RACH preamble (e.g., P7, in this example) to transmit their Msg1.

For example, both the second UE 115 and the fourth UE 115 may transmit an identical Msg1 to the network entity 105-*a*. In some examples, the network entity 105-*a* may not be able to correctly receive either Msg1 due to the collision. In other examples, one UE 115 may be associated with a better performing wireless channel such that the network entity 105-*a* may be able to receive one Msg1 but not the other Msg1. In this example, the network entity 105-*a* may respond with the Msg2 with the uplink grant information. In this scenario, both UEs 115 may transmit Msg3 in the same uplink grant, each with their own unique contention resolution identifiers. However, the network entity 105-*a* may not be able to decode both Msg3. Again, in some examples the network entity 105-*a* may not be able to decode either Msg3 due to the collision. However, in other examples the network entity 105-*a* may be able to correctly receive the Msg3 from a UE 115 having a better performing wireless channel (e.g., a much larger SINR). In this scenario, initiating a Msg3 retransmission may be unhelpful as the Msg3 retransmission may not be UE-specific and, instead, be temporary C-RNTI-specific. So, both UEs 115 may retransmit the Msg3, which may not lead to contention resolution. In the situation where the UE 115-*a* does not receive Msg4 with its identifier within a stipulated window, the UE 115-*a* may retry the RACH procedure with the network entity 105-*a*.

Thus, in the example shown in Table 1 the network entity 105-*a* may transmit the RAR with the uplink grant information for the RAPID corresponding to P1, P6, and P7. Each UE 115 may respond with a Msg3 transmission. The network entity 105-*a* may successfully decode the Msg3 from UE1 and UE3 and send their Msg4 with their contention resolution identifiers. However, the Msg3 from UE2 and UE4 will either be undecodable (e.g., due to the collision) or one UE 115 (e.g., the UE 115 with the stronger SINR) out of UE2 or UE4 will be successful and the Msg4 will address that UE's contention resolution identifier.

Another contention-based RACH procedure may include a two-step RACH procedure where Msg1 and Msg3 may be combined into a message A (MsgA) and Msg2 and Msg4 may be combined into a message B (MsgB). This approach may reduce the latency associated with RACH procedure. However and similar to the four-step RACH procedure, if two or more UEs 115 select the same preamble, the two or more UEs may be involved in a contention and at most one of those UEs 115 may successfully receive a MsgB.

One variation of the two-step RACH procedure may include a RACH-less EDT being used in NB-IoT communications over a non-terrestrial network (NT). In RACH-less EDT, the UE 115-*a* may directly transmit data in the first transmission (e.g., without preamble) by choosing the data resources (as opposed to preambles too) from a pool of data resources for contention-based transmission. The UE 115-*a* may wait for a response to the data transmission within a time window. This technique may be feasible in NTNs when the UE 115-*a* is GNSS-capable and has location information of the UE 115-*a* and the satellite (e.g., from the satellite ephemeris). However, even in this situation the collision discussed above may be applicable. For example, if two or more UEs 115 select the same data resource (e.g., corresponding to the preamble resource discussed above) for transmission of the RACH-less EDT, there may be a collision at the network entity 105-*a*, in which case and the random access will fail (e.g., the RACH-less EDT transmission will fail).

For example, and continuing with the example shown in Table 1, the network entity 105-*a* may send a response (e.g., the MsgB or an acknowledgment to the RACH-less EDT) corresponding to the data resources (e.g., which may be designated D1, D6, and D7 corresponding to P1, P6, and P7 from Table 1) with unique contention resolution identifiers for UE1 and UE3. However, for the data resource D7, the network entity 105-*a* may not detect (e.g., absent a large difference in SINR between UE2 and UE4)) the transmission. Accordingly, the network entity 105-*a* may not be able to detect the unique contention resolution identifier from either UE2 or UE4. For both UE2 and UE4, the contention resolution may fail and each UE 115 may restart the RACH procedure after waiting for the response window time. However, NTNs may be generally associated with a large round-trip time (RTT) or round-trip delay (RTD). In this aspect, the response time window for Msg2, Msg4, MsgB, or a response to RACH-less EDT may be generally quite large. This may result in large delays when the UE 115 is not successful in completing the RACH procedure on the first try (e.g., such as in the case of a collision, as discussed above). Accordingly, it may be beneficial to reduce the probability of collisions to reduce the probability of failure of the RACH procedure and, therefore, the large delays that a collision entails (e.g., such as in an NTN).

In some wireless networks, the default scheme for random-access in a slotted ALOHA method. In this method, the wireless channel may be divided into small, fixed-length time slots or blocks of time and the UEs 115 may only be allowed to transmit data at the beginning of each time slot or time block. For example, each UE 115 may pick a preamble (or a data resource for RACH-less EDT) from a set of preambles (or a pool of data resources) uniformly and randomly. However, if more than one UE 115 picks the same preamble (or data resources), there may be a collision at that preamble (or data resource) and all UEs 115 transmitting that preamble (or on that data resource) may fail the random-access/data transmission. For example, each UE 115 may either collide in the Msg3 transmission (for preamble-based four-step RACH) or not receive a contention resolution success indication (e.g., an acknowledgement) in response to the preamble or the data (e.g., in RACH-less EDT) transmission.

A diversity slotted ALOHA (DSA) approach may be used to minimize the chances of collisions between multiple UEs 115. Generally, this may include grouping TOs together where each UE 115 may transmit at least one or more than one access signal (e.g., Msg1, Msg3, with or without a corresponding Msg1, MsgA, or data in RACH-less EDT) to the network entity 105-*a*. For example, and as is shown in FIG. 2, this may include a group of TOs having three TOs (e.g., TO1, TO2, and TO3), in this example. Generally, each TO may include a time slot or block of time during which any UE 115 may transmit the data or access signals to the network entity 105-*a*. Each TO may include a single time slot or time block during which the access signal transmissions may occur or may include multiple time slots or time blocks (e.g., for repetition-based access signal transmissions). Each time slot or time block may span one or more symbols, one or more slots, or one or more radio frames.

This may include the network configuring the UE 115-*a* with the group of TOs. For example, the network entity 105-*a* may transmit or otherwise provide (and the UE 115-*a* may receive or otherwise obtain) a configuration for a group of TOs that include more than one TO (e.g., three TOs, in this non-limiting example). In some examples, the configuration may be for multiple groups of TOs. For example, each group of TOs may have similar TOs (e.g., the same number and configuration of TOs) or may have different TOs (e.g., a different number or configuration of TOs). In some aspects, the UE 115-*a* may receive or otherwise obtain the configuration for the group(s) of TOs via a system information block (SIB) or via RRC signaling from the network entity 105-*a*.

Each TO in the group of TOs may include a set of resources shared by multiple UEs 115 for contention-based data or access signal transmissions. In this non-limiting example, the set of resources available during each TO includes eight RACH preamble resources (P1-P8). However, in the example where the data or access signal transmissions are for RACH-less EDT, the set of resources may include data resources (e.g., D1-D8). Generally, each resource in the set of resources may include time resources, frequency resources, spatial resources, or code resources that are to be used by UEs 115 selecting that resource for data or access signal transmission to the network entity 105-*a*.

In this example, the group of TOs may include N TOs (e.g., N=3 in this example) that make up the TO group. Each TO may generally include a set of resources (e.g., preamble resources, such as P1-P8, or data resources, such as in RACH-less EDT) that may be shared by multiple UEs 115 for contention-based data or access signal transmissions. In some aspects, the group of TOs may be formed based on or otherwise associated with a coverage enhancement level associated with the UE 115-*a*, a number of repetitions to be used for transmission in a TO, or a transport block size (TBS) metric associate with at least one data or access signal transmission from the UE 115-*a*. The coverage enhancement level associated with a UE 115-*a* may be dependent on or based on, for example, a received downlink signal quality at the UE 115-*a*. This may be determined based on a reference signal receive power (RSRP) level or a reference signal received quality (RSRQ) level. This may be expressed in terms of the number of repetitions that are configured for transmission (e.g., UEs 115 with a poorer RSRP may select resources from a coverage enhancement level pool which is configured with a larger number of repetitions, than may a UE 115 with a higher RSRP value). In some aspects, this may include one group of TOs being configured with UEs 115 for a first coverage enhancement level and a different group of TOs being configured for UE with a second (e.g., different) coverage enhancement level (e.g., multiple groups of TOs).

With regard to the TBS, if the UE 115-*a* selects to use or is configured to use a low TBS, the UE 115-*a* may pick a resource (e.g., TO) from a resource pool (e.g., from a group of TOs or from a different group of TOs) with fewer repetitions. For a transmission with a larger TBS, the UE 115-*a* may select a resource from a resource pool with a larger number of repetitions.

The UE 115-*a* may be provided through SIB or other signaling, the grouping of TOs into TO groups within which a UE 115-*a* performs burst transmissions. The configuration may be specified per coverage enhancement level or per TBS. The group(s) of TOs may be contiguous or noncontiguous and may be disjointed or have at least partial overlap across groups.

In some aspects, the UE 115-*a* may receive or otherwise obtain (and the network entity 105-*a* may transmit or otherwise output) an indication of a burst size associated with the group of TOs. The burst size may identify a quantity of TOs in the group of TOs during which the UE 115-*a* is to perform data or access signal transmission. For example, a burst size (e.g., k) may also be configured that generally defines the number of TO(s) in the group(s) of TOs during which the UEs 115 may perform access signal transmissions. In one non-limiting example, the burst size may be set to two (e.g., k=2) such that each UE 115 is expected to perform two data or access signal transmissions during two TOs in the group of TOs. Accordingly, each UE 115 may select two out of the three TOs in the group and select a preamble resource (e.g., P1-P8, in this example) or a data resource (e.g., D1-D8 in RACH-less EDT) in each TO for the data or access signal transmission. Each UE 115 may independently and randomly select the preamble resource or data resource from more than one TO in the group of TOs. For example, in each of the k TOs the UE 115 may select a resource from the available resources independently and randomly to use to transmit the at least one data or access signal transmission.

Aspects of the described techniques may also provide for an irregular repetition slotted ALOHA (IRSA) approach. In this approach, the UE 115-*a* may select a burst size k from an available list of burst sizes (e.g., according to a burst size probability). For example, the network entity 105-*a* may transmit or otherwise output (and the UE 115-*a* may receive or otherwise obtain) an indication of a set of burst sizes associated with the group(s) of TOs. Each burst size (e.g., k) in the set of burst sizes may identify the number of TO(s) in the group(s) of TOs during which the UE 115-*a* is to perform a data or access signal transmission. The UE 115-*a*, in this example, may select a burst size from the set of burst sizes. The quantity of data or access signal transmission may be performed during the corresponding TOs according to the burst size. For example, if the UE 115-*a* selects a burst size of two (e.g., k=2), the quantity of data or access signal transmissions may be two transmissions performed during two TOs. In another example where the UE 115-*a* selects a burst size of six (e.g., k=6), the UE 115-*a* may perform six data or access signal transmissions during six TOs from the group of TOs. Accordingly, N TOs may be grouped into a TO group and the UE 115-*a* may select k of the N TOs in the group to transmit data or access signal transmissions. In each of these k TOs, the UE 115-*a* may select or otherwise select a resource (e.g., any of P1-P8, or D1-D8 for RACH-less EDT) from the available resources independently and randomly (e.g., according to a random selection scheme) and performs the data or access signal transmission in or using the selected resource.

In some aspects, the set of burst sizes may include different burst sizes for different UEs 115 (e.g., a subset of UEs 115 of the multiple UEs 115). For example, the configuration for the set of burst sizes may be specified per-coverage enhancement level or per TBS associated with each UE 115. In some aspects, the set of burst sizes may be specified as common for all TO groups or may be specified for each TO group separately or specified commonly for sets of TO groups. For example, the set of burst sizes may include a common burst size for all TOs in the group of TOs, as a unique burst size for each TO in the group of TOs, or as a same burst size for multiple groups of TOs. For example, the set of burst sizes associated with a first group of TOs may be different from a set of burst sizes associate with a second group of TOs.

In some aspects, the UE 115-*a* may select the TO (e.g., uniformly at random) after selecting a burst size. As one non-limiting example, the UE 115-*a* may include the exact TO(s) to transmit in (e.g., if k=2 and N=6, then UE 115-*a* may randomly pick TO1 and TO4) independently and uniformly at random. The exact resource within a TO (e.g., if there are 48 resources 1. in a TO) may be selected by the UE 115-*a* randomly (e.g., the UE 115-*a* may randomly select resources number 17 from the 48 resources in the TO). This approach may be applied for both the DSA approach or the IRSA approach discussed above (e.g., the UE 115-*a* selects the TO(s) randomly and then randomly selects a resource from the TO to transmit the data or access signal transmission).

Accordingly, in some aspects, the burst size may be provided as a single entry (e.g., the same burst sizes for all UEs 115), such as according to the DSA approach discussed above, or may be a list of burst sizes from which the UE 115-*a* samples the burst size for the current TO group, such as according to the IRSA approach discussed above. Each burst size may correspond to an integer that is equal to or larger than one. In some aspects, the UE 115-*a* may be configured or otherwise provided with the burst size configuration through SIB or other signaling.

In some aspects, a bursting size probability may be associated with the burst size. For example, the network entity 105-*a* may transmit or otherwise output (and the UE 115-*a* may receive or otherwise obtain) an indication of burst size probabilities associated with the set of burst sizes. The UE 115-*a* may select the burst size from the set of burst sizes according to the burst size probability. For example, the UE 115-*a* may be configured or otherwise provided (e.g., via SSB signaling or other signaling means) with the indication of the probabilities with which the burst size for the current group of TOs is sampled from the burst size list (e.g., as previously indicated). The configuration for the burst size probabilities may be specified per coverage enhancement level of the UE 115-*a* or per TBS of the associated data or access signal transmission(s). For example, an optional field containing a list of a same length as the set of burst sizes whose entries are in the interval [0,1] and add up to one.

As one non-limiting example, the group of TOs may include eight TOs (e.g., N=8) and the burst size set (e.g., the set of burst sizes) associated with the group of TOs may be configured as [1,2,4,6]. The burst size probabilities for the corresponding burst sizes in this example may be configured as [0.5,0.25,0.125,0.125]. The UE 115-*a* may select a burst size of TO 1 using a weighting point of 0.5, of TO 2 using a weighting point 0.25, of TO 4 using a weighting point of 0.125, or of TO 4 using a weighting point of 0.125. For example, the UE 115-*a* may select from the set of burst sizes according to the burst size probabilities indicated to the UE 115-*a* for the group of TOs. In an example where the burst size probabilities are not specified for the UE 115-*a*, the UE 115-*a* may select a burst size from the set of burst sizes according to a (pre) defined distribution, such as a discrete uniform distribution.

Accordingly, the UE 115-*a* may perform at least one data or access signal transmission in at least one TO in the group of TOs. For example, the UE 115-*a* may use a resource from the set of resources of the at least one TO. More particularly, the UE 115-*a* may be configured with N TOs in the group of TOs, select the burst size k indicating how many TOs in the group of TOs the UE 115-*a* will use, and then select a resource from each of the k TOs to use to perform the data or access signal transmissions. In some aspects, the UE 115-*a* may perform these selections randomly (e.g., according to a random selection scheme).

In some aspects, the at least one data or access signal transmission may also be referred to as a burst. For example, the burst may include multiple copies of the same information conveyed in each data or access signal transmission from the UE 115-*a*. Examples of the types of messages may be conveyed in the at least one data or access signal transmission include, but are not limited to, a RACH preamble transmission, a RACH MsgA, a RACH-less EDT, a RACH Msg3 transmission (e.g., with or without a corresponding RACH Msg1 transmission) or a contention-based preconfigured uplink resources (PUR) data transmission.

In some aspects, the described techniques may further provide for contention resolution DSA (e.g., CRDSA). For example, the burst size may be fixed (e.g., according to DSA) or the UE 115-*a* may select the burst size from the set of burst sizes (e.g., IRSA), such as according to the probability distribution when configured. N TOs may be grouped into a TO group and the UE 115-*a* may select k of the TOs to transmit in. In this CRDSA example and where k is two or more, the UE 115-*a* may include or otherwise convey an indication of a reference to the other data or access signal transmissions that it has transmitted in. This approach may enable the network entity 105-*a*, upon successfully decoding at least one copy of the burst by the UE 115-*a* (e.g., the data or access signal transmission in one TO), to remove interference from the other copies in the burst to enable decoding of other UEs 115 whose transmissions have collided in those resources and TO pair. This interference cancellation followed by decoding may be repeated multiple times by the network entity 105-*a*.

For example, the UE 115-*a* may include or otherwise convey a first information in a first data or access transmission during a first TO. The first information may carry or otherwise convey information that identifies a second data or access signal transmission that was performed during a second TO. In some examples, the UE 115-*a* may include or otherwise convey a second information in the second data or access transmission during the second TO. The second information, in this example, may carry or otherwise convey information that identifies the first data or access signal transmission that was performed during the first TO. For example, to easily and effectively perform interference cancellation, the network entity 105-*a* may know the location or contents of the other data or access signal transmissions within the burst for a corresponding UE 115. The data or preamble carried by each copy within a burst from the same UE 115 may be the same. For example, the at least one data or access signal transmission during k TOs of the group of N TOs may be copies of each other in each TO (e.g., the same information is transmitted in each TO from a UE 115). The UE 115-*a* may communicate (e.g., within one or each copy) the location of the other copies within the burst. In some aspects, this information may be communicated in a MAC-CE or in an RRC message. In some aspects, this information may be embedded in the transmission using a {TO, resource} pair of each copy of the burst in a predefined order or can be a reference to a row in a lookup table or can be a list of temporary C-RNTI (TC-RNTI).

For example, the first information or the second information may include at least one of an ordered pair of the at least one TO and resource index for the resource (e.g., l) from the set of resources associated with the at least one TO, an index that is associated with an ordered pair, or a RNTI (e.g., the TC-RNTI) associated with the ordered pair. The ordered pair may generally refer to the k TO from the group of TOs that the UE 115-*a* has used to transmit a data or access signal transmission and an index to the resource from the set of resources associated with that TO.

The UE 115-*a* may monitor for at least one response message based on the at least one data or access signal transmission. In some aspects, the response from the network entity 105-*a* may be a separate response for each TO or may be a combined response for a group of TOs. Which option to select may be configured or otherwise indicated to the UE 115-*a* via SIB or other signaling means (e.g., in RRC signaling).

For example, in some aspects, the UE 115-*a* may monitor for a set of multiple response messages associated with multiple data or access signal transmission during a corresponding multiple TOs. Each response message, in this example, may correspond to a data or access signal transmission perform during a corresponding TO. In some aspects, each response message in the set of multiple response messages may be associated with a response window or a response timer associated with the corresponding TO (e.g., per-TO response windows or response timers). For example, the UE 115-*a* may continue to monitor for a response for each TO it has transmitted in (e.g., within a TO group) using separate response windows or response timers for each of the TOs.

In another example, a combined response message may be used by the network entity 105-*a*. For example, the UE 115-*a* may monitor for a common response message associated with multiple data or access signal transmissions in the group of TOs. In this example, the common response message may be associated with a response window or a response timer associated with the group of TOs (e.g., per-TO group response window or response timer). The UE 115-*a* may monitor for the response with a response window that is defined from the end of the TO group (e.g., instead of from the end of a TO). The UE 115-*a* may use a single response window or response timer for the common response message.

In some aspects, the success of the at least one data or access signal transmission may be based on at least one resource (e.g., TO and resource pair) in which the UE 115-*a* transmits not colliding with a transmission from another UE 115. However, if the UE 115-*a* does not receive or otherwise obtain a response for any of the transmissions in a burst, the UE 115-*a* may be configured to declare a failure and retry the transmission procedure or continue with an updated set of transmission parameters (e.g., a smaller number of transmissions in the burst). For example, the UE 115-*a* may identify or otherwise determine that the at least one response message was not received during a response window or response timer. Accordingly, the UE 115-*a* may identify or otherwise determine that the at least one data or access signal transmission to be a failure based on the at least one response message not being received.

FIG. 3 shows an example of a TO group 300 that supports postponement in contention-based TO groups in accordance with one or more aspects of the present disclosure. The TO group 300 may implement aspects of wireless communications system 100 or wireless communications system 200.

As discussed herein, multiple (e.g., more than one) TOs may be grouped into a group of TOs. For example, a UE 115 may receive a configuration for a group of TOs where each TO in the group of TOs includes a set of resources that may be shared by multiple UEs 115 for contention-based data (e.g., EDT) or access signal (e.g., RACH) transmissions. The UE 115 may perform at least one data or access signal transmission in at least one TO in the group of TOs using a resource from the set of resources of the at least one TO. The UE 115 may monitor for at least one response message based on the at least one data or access signal transmission.

In the non-limiting example shown in FIG. 3, the group of TOs includes three TOs (e.g., a first TO 305, a second TO 310, and a third TO 315). However, it is to be understood that the group of TOs may include more than three TOs or may include fewer than three TOs (e.g., two TOs). Further, each TO in the group of TOs may have an associated set of resources. In this non-limiting example, the set of resources for each TO includes eight resources. For example, each TO in the group of TOs may be associated with a first preamble or data resource 320, a second preamble or data resource 325, a third preamble or data resource 330, a fourth preamble or data resource 335, a fifth preamble or data resource 340, a sixth preamble or data resource 345, a seventh preamble or data resource 350, and an eighth preamble or data resource 355. For example, each resource in set of resources may correspond to a preamble resource (e.g., for use during a RACH procedure) or a data resource (e.g., for use during RACH-less EDT).

In the non-liming example shown in FIG. 3, twelve UEs (e.g., UE-A through UE-L) use the group of TOs to perform at least one data or access signal transmission. In this non-limiting example, each of the twelve UEs selects a burst size of two such that each UE performs a burst during two of the three TOs in the group of TOs. For example, and during the first TO 305, the UE-D selects the first preamble or data resource 320, the UE-H selects the fourth preamble or data resource 335, both the UE-F and the UE-L select the fifth preamble or data resource 340, the UE-B selects the sixth preamble or data resource 345, and the UE-K selects the eighth preamble or data resource 355 to perform their respective data or access signal transmission. During the second TO 310, both the UE-C and the UE-F select the first preamble or data resource 320, the UE-H selects the second preamble or data resource 325, the UE-E selects the third preamble or data resource 330, the UE-L selects the fourth preamble or data resource 335, the UE-K selects the fifth preamble or data resource 340, each of the UE-A, the UE-G, and the UE-J select the sixth preamble or data resource 345, and the UE-I selects the seventh preamble or data resource 350 to perform their respective data or access signal transmission. During the third TO 315, the UE-B selects the first TO 305, each of the UE-A, the UE-G, and the UE-I select the third preamble or data resource 330, both of the UE-E and the UE-J select the fourth preamble or data resource 335, the UE-C selects the fifth preamble or data resource 340, and the UE-D selects the seventh preamble or data resource 350 to perform their respective data or access signal transmission. As noted, in this non-limiting example each UE 115 has selected a burst size of two (e.g., k=2) such that each UE performs a data or access signal transmission during two TOs in the group of TOs.

As can be seen, collisions may occur between some of the UEs 115. For example, the UE-F and the UE-L have colliding transmissions during the first TO 305 using the fifth preamble or data resource 340. As another example, the UE-C and the UE-F have colliding transmissions during the second TO 310 using the first preamble or data resource 320, and the UE-A, the UE-G, and the UE-J have colliding transmissions during the second TO 310 using the sixth preamble or data resource 345. Similarly, the UE-A, the UE-G, and the UE-I have colliding transmissions during the third TO 315 using the third preamble or data resource 330, and the UE-E and the UE-J have colliding transmissions during the third TO 315 using the fourth preamble or data resource 335.

In some examples, UEs having a successful data or access signal transmission may include UE-B, UE-C, UE-D, UE-E, UE-H, UE-I, UE-K and UE-L since each UE 115 has at least one non-colliding transmission out of the two transmissions within the group of TOs. For example, although each of the UE-C, the UE-E, the UE-I, and the UE-L have one colliding transmission, each UE has also selected a resource within at least one TO to perform its data or access signal transmission during at least one TO in the group of TOs. For example, the UE-L has a colliding transmission during the first TO 305 but does not have a colliding transmission during the second TO 310. Similarly, the UE-C has a colliding transmission during the second TO 310 but the transmission of the UE-C during the third TO 315 does not collide with any other UE transmission(s). Accordingly, each UE 115 in this example may have a successful data or access signal transmission using the techniques described herein. For example, the chance of the data or access signal transmission being successful is increased using the TO grouping techniques describe herein.

Further, in some aspects, some or all of the UEs 115 using the group of TOs may indicate first information and, in some examples, the second information in each data or access signal transmission that points to the other transmission. In this example, the network entity 105 may use interference cancellation to achieve greater success in successfully decoding the colliding data or access signal transmissions. For example, using interference cancellation based on the first and second information may result in the UE-F and the UE-L having successful data or access signal transmissions. For example, the network entity 105 may use interference cancellation to remove the interference from the UE-L during the first TO 305 to recover the transmission from the UE-F. Similarly, the network entity 105 may use interference cancellation to remove the interference from the UE-E during the third TO 315 to recover the transmission from the UE-J. Accordingly, the successful UEs 115 after one-step interference cancellation may now include the UE-B, UE-C, UE-D, UE-E-, UE-F, UE-H, UE-I, UE-J, UE-K, and UE-L. Each of UE-A and UE-G may have unsuccessful data or access signal transmissions due to both transmission from these UEs colliding with multiple UEs.

Figure 4:
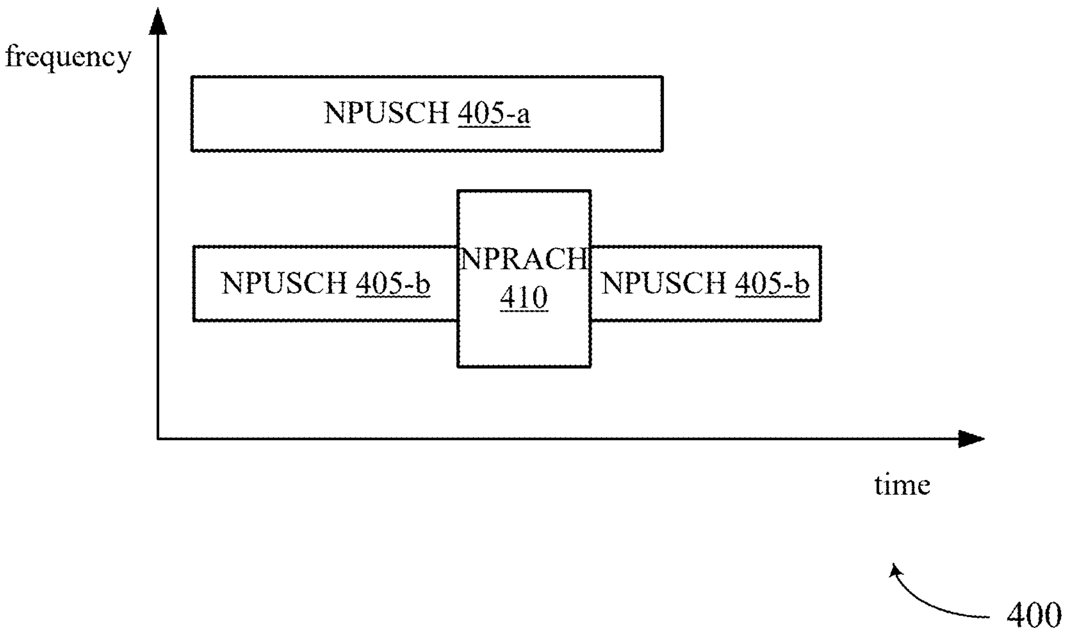
FIG. 4 shows examples of transmission timing diagrams that support postponement in contention-based TO groups in accordance with one or more aspects of the present disclosure.
Figure 4:
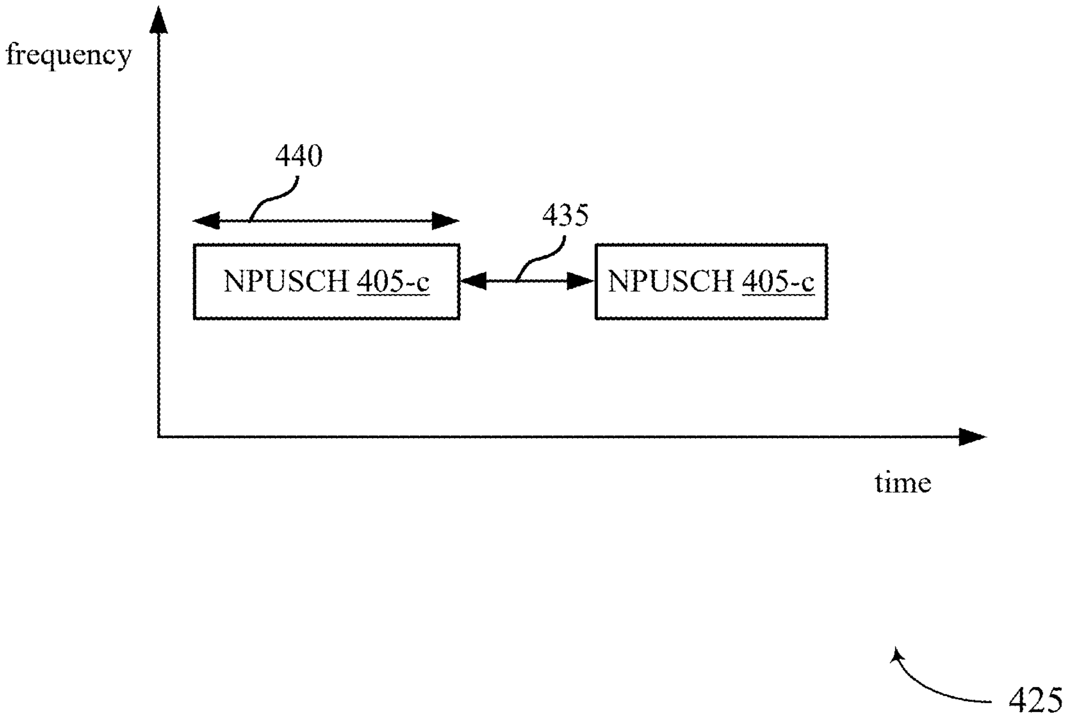

FIG. 4 shows an example of a transmission timing diagram 400 and a transmission timing diagram 425 that support postponement in contention-based TO groups in accordance with one or more aspects of the present disclosure. The transmission timing diagram 400 and the transmission timing diagram 425 may implement or may be implemented by aspects of the wireless communications system 100 or the wireless communications system 200.

In narrowband IoT (NBIoT), if a narrowband physical uplink shared channel (NPUSCH) 405 that maps to $N_{slots}$ slots or a repetition of the NPUSCH 405 contains a resource that overlaps with an NPRACH resource 410, the NPUSCH 405 in the overlapped $N_{slots}$ may be postponed until the next valid $N_{slots}$ that is not overlapping with any configured NPRACH resource. For example, as shown in the transmission timing diagram 400, the NPUSCH 405-*a* may not overlap with an NPRACH, and thus may be transmitted without a gap. The NPUSCH 405-*b* may overlap with the NPRACH resource 410, and thus a gap may exist between the first portion of the NPUSCH 405-*b* and the second portion of the NPUSCH 405-*b*. For example, NPUSCHs 405 may have long durations in NBIoT due to increased repetitions and/or lower frequency allocation. Thus, it may not be possible in some cases to schedule NPUSCHs 405 in NBIoT without overlaps with NPRACH resources 410. To prevent interference between NPUSCHs 405 and transmissions in NPRACH resources 410, the NPUSCHs 405 that overlap with NPRACH resources 410 may be delayed.

In NBIoT, after transmissions and/or postponement due to NPRACH of 256*30720 $T_s$ time units, for frame structure type 1, a gap of 40*30720 $T_s$ time units may be inserted where the NPUSCH 405 is postponed. For example, as shown in the transmission timing diagram 425, the first portion of the NPUSCH 405-*c* may have a duration 440 of 256*30720 $T_s$ time units, and accordingly a gap 435 of 40*30720 $T_s$ time units may be inserted after the first portion of the NPUSCH 405-*c*. The UE 115 may resume transmission of the second portion of the NPUSCH 405-*c* after the gap 435. For example, a half-duplex UE 115 may not transmit in uplink and monitor in downlink simultaneously. Accordingly, after a duration transmitting on uplink, the half-duplex UE 115 may monitor downlink signals from the network to synchronize downlink timing with the network. Accordingly, the gap 435 may be inserted between long uplink transmissions. The serving network entity 105 may be aware of the location of gaps for long uplink transmissions by half-duplex UEs 115.

Figure 5:
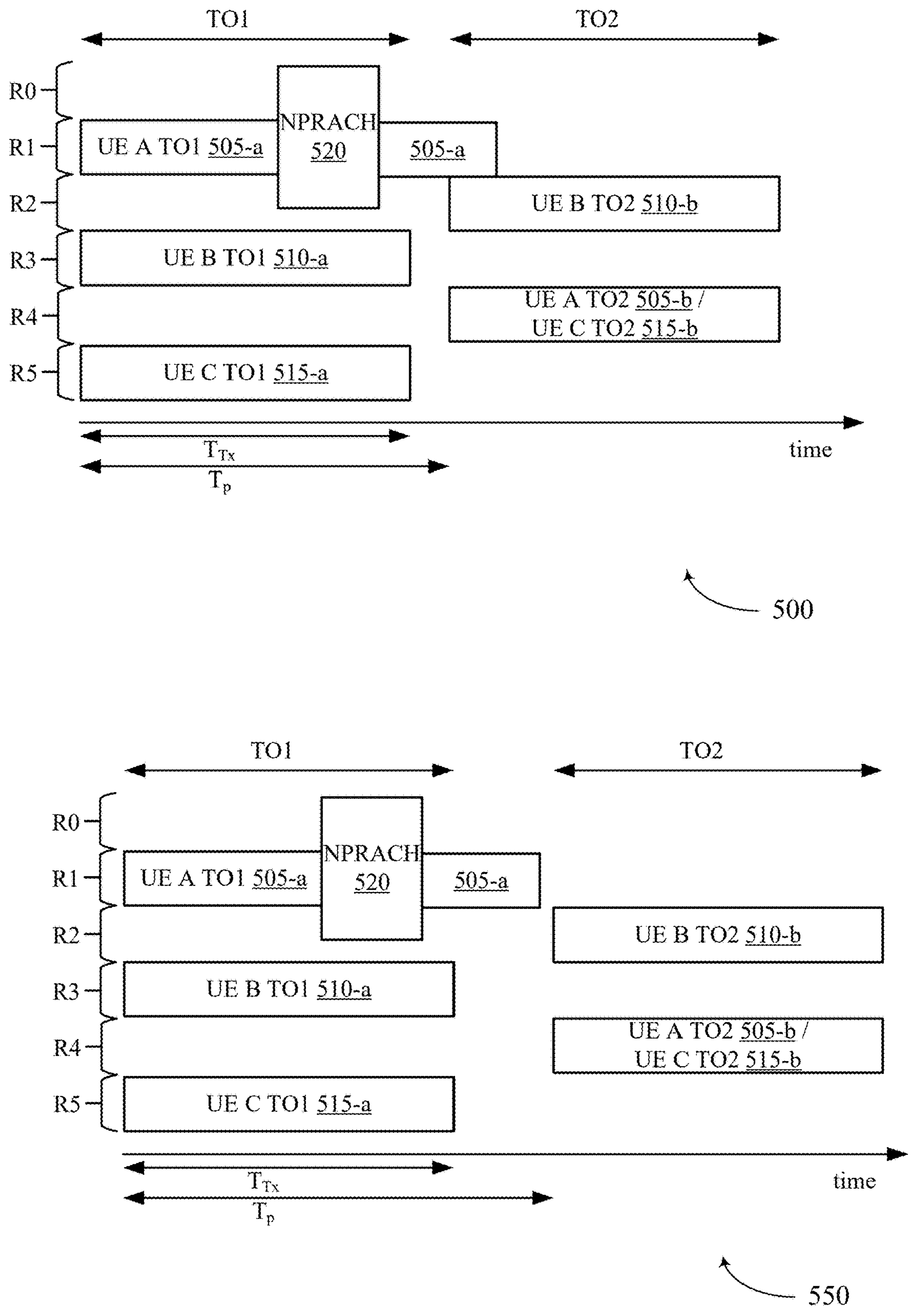
FIG. 5 shows examples of TO timing diagrams that support postponement in contention-based TO groups in accordance with one or more aspects of the present disclosure.

FIG. 5 shows an example of a TO timing diagram 500 and a TO timing diagram 550 that support postponement in contention-based TO groups in accordance with one or more aspects of the present disclosure. The TO timing diagram 500 and the TO timing diagram 550 may implement or may be implemented by aspects of the wireless communications system 100 or the wireless communications system 200.

For example, as shown in the TO timing diagram 500 and the TO timing diagram 550, a network entity 105 may configure a group of TOs that include a TO1 and a TO2 for multiple UEs 115 (e.g., including a UE A, a UE B, and a UE C).

Within a TO, each transmission by each UE 115 transmitting in the same resource may reach the network entity 105 within a small arrival window (e.g., within a cyclic prefix) to reduce decoding complexity at the network entity 105. If a UE 115 is unable to begin transmission in a particular TO in a timely manner due to a postponement in a previous TO within a TO group (e.g., due to an overlapping NPRACH or an uplink gap), the transmission of the NPUSCH from the UE 115 in the particular TO may arrive at the network entity 105 outside of the arrival window). Such postponement may not occur in the 2-step or 4-step RACH procedures, as the UE 115 may not have an uplink transmission immediately prior to the RACH procedure as the UE 115 may perform a single RACH procedure at a time. In the context of CDRSA, however, if the TOs within a group are scheduled close to each other in time, a UE 115 may not have completed transmission of an NPUSCH in a previous TO (e.g., including postponement and uplink gaps) before the start of the next TO. Random access occasions may be defined by a periodicity and offset. For example, the network entity 105 may indicate to UEs 115 the grouping of TOs via a SIB or other signaling, as described herein (e.g., with reference to FIG. 2). The groupings of TOs may be per specified coverage enhancement level and/or per TBS as described herein. Groupings of TOs may be contiguous or noncontiguous, and groupings of TOs may be disjoint or may have overlaps across groups.

As shown in the TO timing diagram 500 and the TO timing diagram 550, each TO (e.g., the TO1 and the TO2) may have a duration $T_{Tx}$. If N=k=2, each UE 115 (e.g., the UE A, the UE B, and the UE C) may each transmit in both the TO1 and the TO2. The UE A may select to transmit the first transmission 505-*a* of an NPUSCH in resource 1 of TO1 and may select to transmit the second transmission 505-*b* of an NPUSCH in resource 4 of TO2. The UE B may select to transmit the first transmission 510-*a* of an NPUSCH in resource 3 of TO1 and may select to transmit the second transmission 510-*b* of an NPUSCH in resource 2 of TO2. The UE C may select to transmit the first transmission 515-*a* of an NPUSCH in resource 5 of TO1 and may select to transmit the second transmission 515-*b* of an NPUSCH in resource 4 of TO2.

As shown in the TO timing diagram 500, if TO1 overlaps with an NPRACH 520, the first transmission 505-*a* by the UE A in the TO1 may be postponed due to the overlap with the NPRACH 520. The TO2 may begin at time $T_p$ (e.g., where $T_p$ is a configured periodicity of the TO1 and the TO2), and thus to transmit in TO2, the UE A may begin transmission of the second transmission 505-*b* before completing the first transmission 505-*a* in the TO1. If the UE A were to postpone the second transmission 505-*b* in the TO2 until after completion of the first transmission 505-*a* in the TO1, the second transmission 505-*b* of the UE A and the second transmission 515-*b* of the UE C in resource 4 of TO2 may arrive at the network entity 105 at different times, which may cause decoding disruptions at the network entity 105. To avoid decoding disruptions at the network entity 105, the UEs 115 that transmit in the same resource in the same TO may begin the transmissions at the same time. In some cases, however, a UE 115 (e.g., the UE C in resource 4 in TO2) may be unaware that another UE 115 that uses the same resource and TO may begin transmission in that resource and TO at a later than scheduled.

Accordingly, in some examples, as shown in the TO timing diagram 550, the network entity 105 may select/configure the periodicity ($T_P$) of the TOs within the TO group to ensure that there is a sufficient time gap between TOs in the same group to avoid misaligned start times caused by postponement. For example, the network entity 105 may be aware of the resources in which NPRACH occasions (such as the NPRACH 520) are scheduled, and thus which UEs 115 may postpone transmissions (e.g., transmissions 505, 510, or 515). Accordingly, the periodicity, $T_P$, may be selected to delay the start of TO2 to account for the presence of the NPRACH 520 as shown in the TO timing diagram 500. In some examples, the network entity 105 may group non-consecutive TOs together into a group to prevent a postponement in one TO from affecting the start time of another TO. Accordingly, a UE 115 that selects to transmit in a particular TO may begin transmission at the indicated start time (e.g., based on the periodicity) without concern regarding whether other transmissions in other TOs in the group are complete. In some examples, the configuration may be constrained so that a transmission by a UE 115 in a previous TO within the same group including gaps, repetitions, and postponement may be completed before the start of the next TO within the same TO group.

Figure 6:
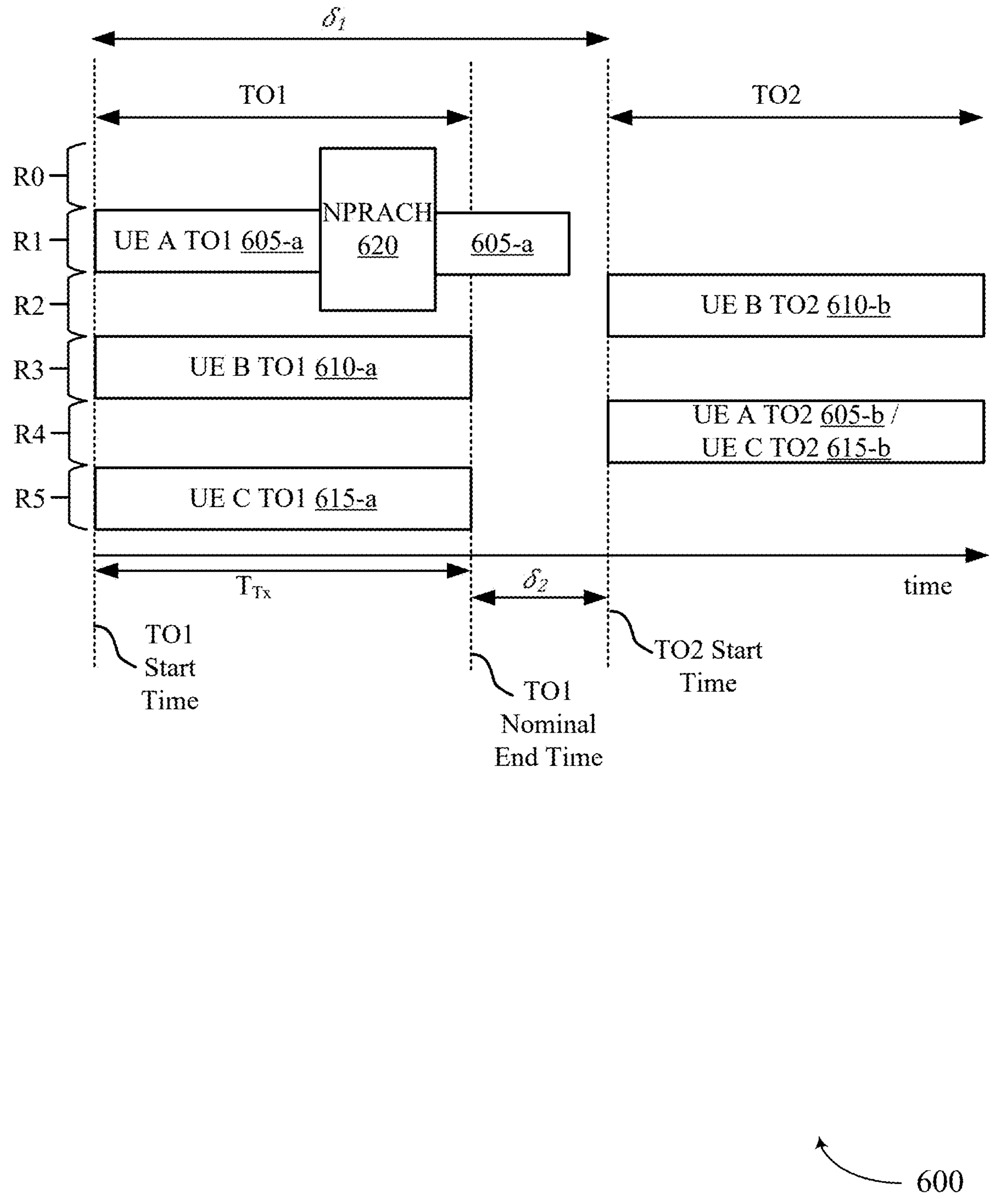
FIG. 6 shows an example of a TO timing diagram that supports postponement in contention-based TO groups in accordance with one or more aspects of the present disclosure.

FIG. 6 shows an example of a TO timing diagram 600 that supports postponement in contention-based TO groups in accordance with one or more aspects of the present disclosure. The TO timing diagram 600 may implement or may be implemented by aspects of the wireless communications system 100 or the wireless communications system 200.

In some examples, as shown in the TO timing diagram 600, as compared to a fixed periodicity between the start of TOs within a TO group, to allow the network entity 105 to have more flexibility and to allow TOs within a TO group to be close in time, the network entity 105 may signal (e.g., through SIB or other signaling) the start of TO groups (e.g., by a periodicity and offset) and may also signal (e.g., through SIB or other signaling) the start of the next TO within a group as a time delta from the start or nominal end of the previous TO in the group.

For example, the nominal end time may be the ending time of a TO if the UE does not perform any postponement due to NPRACH or uplink gaps. For example, in a first signaling option, the network entity 105 may signal, to the UE 115, the start of the TO group (e.g., using a start time and periodicity) and the start of the $n^{th}$ TO within a group may be calculated by the UE 115. For example, the UE 115 may be provided through SIB or other signaling a common delta or a list of TO specific deltas (e.g., in ms or slots). The TO1 may start at the start of the TO group, and the $n^{th}$ TO in the group may start at a time common delta (or TO specific $delta_{n-1}$) after the start of the n−1th TO in the TO group. As another example, in a second signaling option, the UE 115 may be provided through SIB or other signaling a common delta or a list of TO specific deltas (e.g., in ms or slots). The TO1 may start at the start of the TO group, and the $n^{th}$ TO in the group may start at a time common delta (or TO specific $delta_{n-1}$) after the nominal end of the n−1th TO in the TO group. Such deltas may be TO group specific, TO specific, or a common delta for all TOs. The network entity 105 may select the delta to ensure that the transmission in a previous TO in a same TO group ends before the start of a subsequent TO in the group.

For example, as shown in FIG. 6, the network entity 105 may configure the start time of the TO group that includes TO1 and TO2 as the TO1 start time. The nominal duration of a TO, which may be configured by the network entity 105, may be $T_{Tx}$. and accordingly the nominal end time of TO1 may be $T_{Tx}$ after the TO1 start time.

Each UE 115 (e.g., the UE A, the UE B, and the UE C) may each transmit in both the TO1 and the TO2. The UE A may select to transmit the first transmission 605-*a* of an NPUSCH in resource 1 of TO1 and may select to transmit the second transmission 605-*b* of an NPUSCH in resource 4 of TO2. The UE B may select to transmit the first transmission 610-*a* of an NPUSCH in resource 3 of TO1 and may select to transmit the second transmission 610-*b* of an NPUSCH in resource 2 of TO2. The UE C may select to transmit the first transmission 615-*a* of an NPUSCH in resource 5 of TO1 and may select to transmit the second transmission 615-*b* of an NPUSCH in resource 4 of TO2.

TO1 may overlap with an NPRACH 620. Accordingly, the first transmission 605-*a* by the UE A in the TO1 may be postponed due to the overlap with the NPRACH 620. Accordingly the completion of the first transmission 605-*a* may be delayed until after the nominal end time of TO1. The network entity 105 may configure an offset 81 for the TO2 start time with respect to the TO1 start time or an offset 82 for the TO2 start time with respect to the nominal end time of TO1 to account for the postponement of the first transmission 605-*a* due to the overlap with the NPRACH 620.

Figure 7:
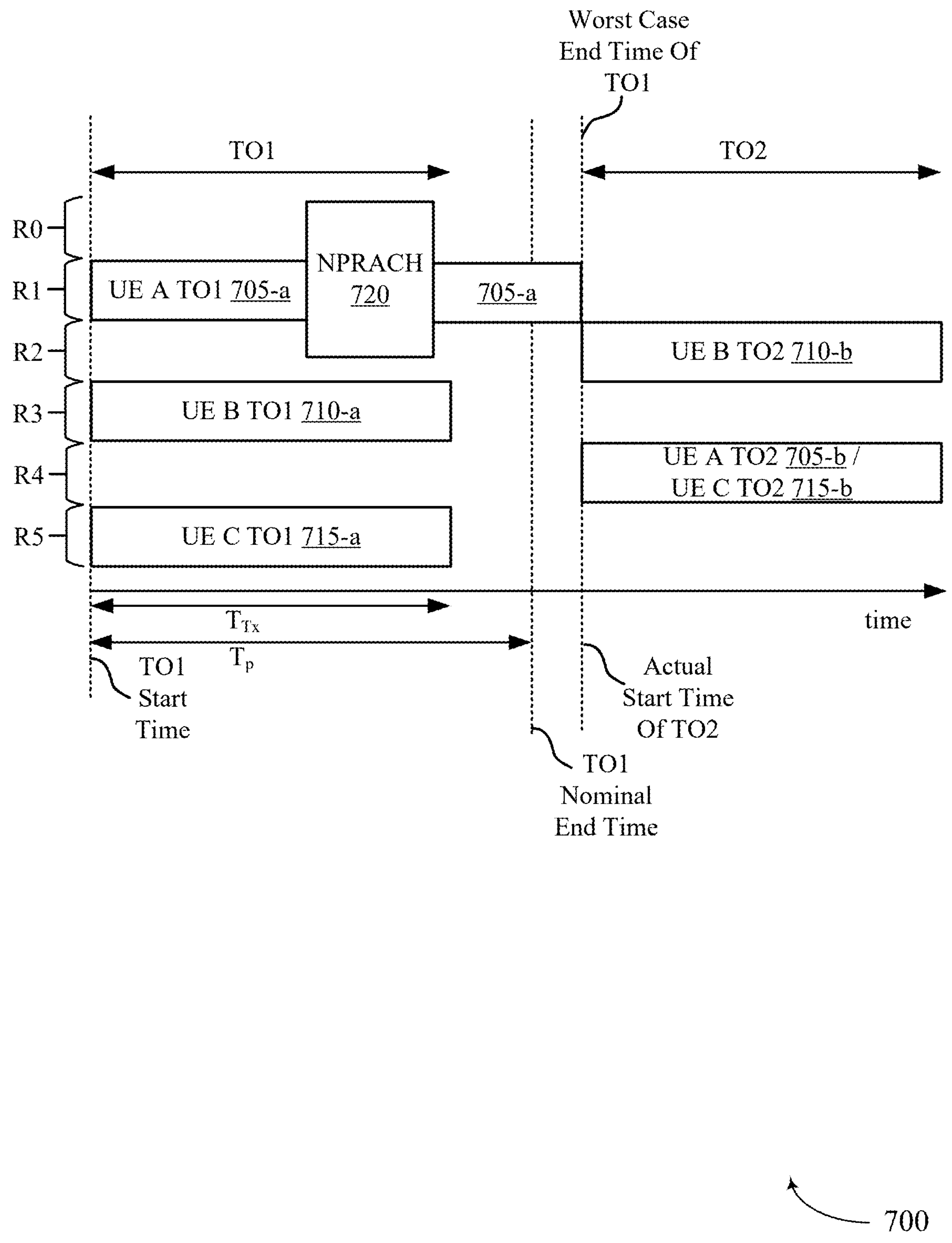
FIG. 7 shows an example of a TO timing diagram that supports postponement in contention-based TO groups in accordance with one or more aspects of the present disclosure.

FIG. 7 shows an example of a TO timing diagram 700 that supports postponement in contention-based TO groups in accordance with one or more aspects of the present disclosure. The TO timing diagram 700 may implement or may be implemented by aspects of the wireless communications system 100 or the wireless communications system 200.

As described with reference to the TO timing diagram 550 and the TO timing diagram 600, the network entity 105 may ensure, via signaling (e.g., of periodicities of TOs or offsets) that transmissions in subsequent TOs in the same TO group do not overlap. In some examples, as shown in the TO timing diagram 700, the UE 115 may compute the TO start times to ensure that transmissions in subsequent TOs in the same TO group do not overlap. For example, the UE 115 may compute the nominal start time of the $n^{th}$ TO (e.g., which may be signaling based on the periodicity $T_P$, start time of the TO group, nominal duration, and/or an offset between TOs). The UE 115 may begin transmission corresponding to the $n^{th}$ TO (e.g., may determine as the actual start time of the $n^{th}$ TO) as the later of the nominal start time of the $n^{th}$ TO and the computed end time of the previous TO ($T_{end,n-1}$).

For example, as shown in FIG. 7, the network entity 105 may configure the start time of the TO group that includes TO1 and TO2 as the TO1 start time. The nominal duration of a TO, which may be configured by the network entity 105, may be $T_{Tx}$. and accordingly the nominal end time of TO1 may be $T_{Tx}$ after the TO1 start time.

Each UE 115 (e.g., the UE A, the UE B, and the UE C) may each transmit in both the TO1 and the TO2. The UE A may select to transmit the first transmission 705-*a* of an NPUSCH in resource 1 of TO1 and may select to transmit the second transmission 705-*b* of an NPUSCH in resource 4 of TO2. The UE B may select to transmit the first transmission 710-*a* of an NPUSCH in resource 3 of TO1 and may select to transmit the second transmission 710-*b* of an NPUSCH in resource 2 of TO2. The UE C may select to transmit the first transmission 715-*a* of an NPUSCH in resource 5 of TO1 and may select to transmit the second transmission 715-*b* of an NPUSCH in resource 4 of TO2.

TO1 may overlap with an NPRACH 720. Accordingly, the first transmission 605-*a* by the UE A in the TO1 may be postponed due to the overlap with the NPRACH 620. Accordingly the completion of the first transmission 605-*a* may be delayed until after the nominal end time of TO1.

Each UE 115 may calculate the TO1 nominal end time based on the periodicity of the TOs and the TO1 start time as signaled by the network entity 105. Each UE 115 may also calculate the worst case end time of TO1 based on Try and the presence of the NPRACH 720 that overlaps with the TO1. Accordingly, each UE 115 may calculate the actual start time of TO2 as the worst case end time of TO1.

Accordingly, in some examples, the UEs 115 may determine the actual start time of an $n^{th}$ TO as the later of the nominal start time of $n^{th}$ TO and $T_{end_{n-1}}$. $T_{end_{n-1}}$ may be the worst case $n-1^{th}$ TO end time (e.g., the latest time a transmission in $n-1^{th}$ TO completes over all UE choices of resources in the n−1th TO).

In some examples, where N=3 and k=2, TOs in the TO group may be scheduled without any time gap between the TOs and each NPUSCH may have a duration of 200*30720 $T_s$. A UE A may select to transmit in TO1 resource 1 and TO2 resource 2 while a UE B may select to transmit in TO2 resource 2 and TO3 resource 3. The UE A, after transmitting in TO 1 may begin transmission in TO2 at the nominal time but may insert an uplink gap after 56*30720 $T_s$. However UE B may not insert an uplink gap at that time in TO2. As both UEs transmit in the same resource, UE A and UE B may not have a mismatch in order to avoid disruption of reception at the network entity 105. To prevent this mismatch, an additional 40*30720 $T_s$ may be included in $T_{end_{n-1}}$ to delay the start of the TO to ensure both UEs 115 may begin an uplink gap at the same time. This also may ensure that the network entity 105 is able to accurately determine the location of uplink gaps. Accordingly, in some examples, $T_{end_{n-1}}$ may also include a final uplink gap time of 40*30720 $T_s$ after the actual worst case $n-1^{th}$ TO end time.

Figure 8:
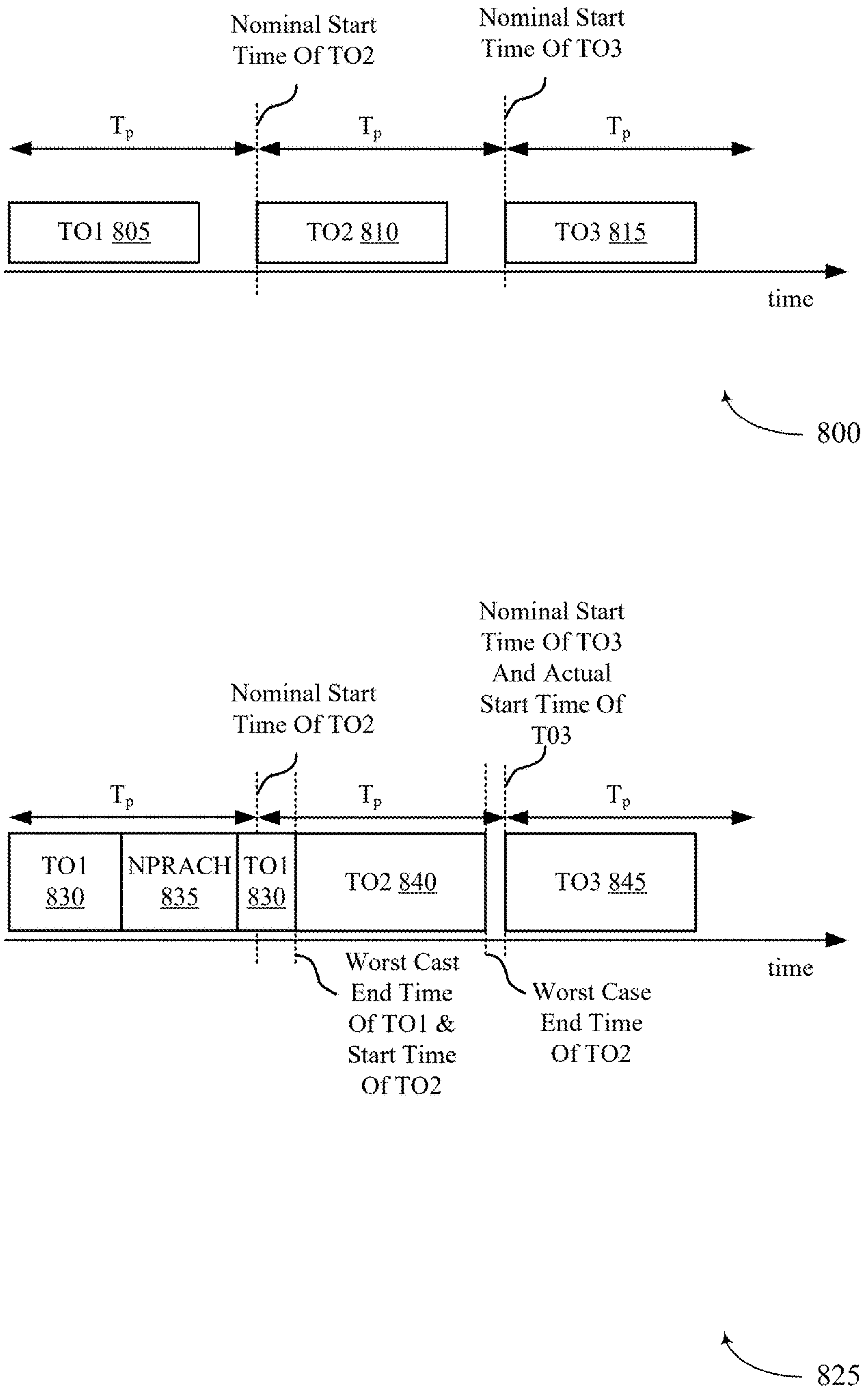
FIG. 8 shows examples of TO timing diagrams that support postponement in contention-based TO groups in accordance with one or more aspects of the present disclosure.

FIG. 8 shows an example of a TO timing diagram 800 and a TO timing diagram 825 that supports postponement in contention-based TO groups in accordance with one or more aspects of the present disclosure. The TO timing diagram 800 and the TO timing diagram 825 may implement or may be implemented by aspects of the wireless communications system 100 or the wireless communications system 200.

As described herein, each UE 115 may calculate, for each TO in a TO group after the first TO, the start time of the TO as the later of a worst case end time of the previous TO and a nominal start time of the TO.

For example, in the TO timing diagram 800, there may be no uplink gaps or NPRACHs overlapping the first TO 805, the second TO 810, or the third TO 815. Accordingly, the actual start time of the second TO 810 may be the nominal start time of the second TO 810 as indicated by the periodicity $T_P$, and the actual start time of the third TO 815 may be the nominal start time of the third TO 815 as indicated by the periodicity $T_P$ of the TO group.

In the TO timing diagram 825, an NPRACH 835 may overlap the first TO 830, and accordingly a nominal start time of the second TO 840 may be earlier than the worst cast end time of the first TO 830. Accordingly, the actual start time of the second TO 840 may be the worst case end time of the first TO 830. The second TO 840 may not overlap with an uplink gap or an NPRACH, and accordingly the worst case end time of the second TO 840 may be before the nominal start time of the third TO 845. Accordingly, the actual start time of the third TO 845 may be the nominal start time of the third TO 845 based on the periodicity $T_P$ of the TOs.

Figure 9:
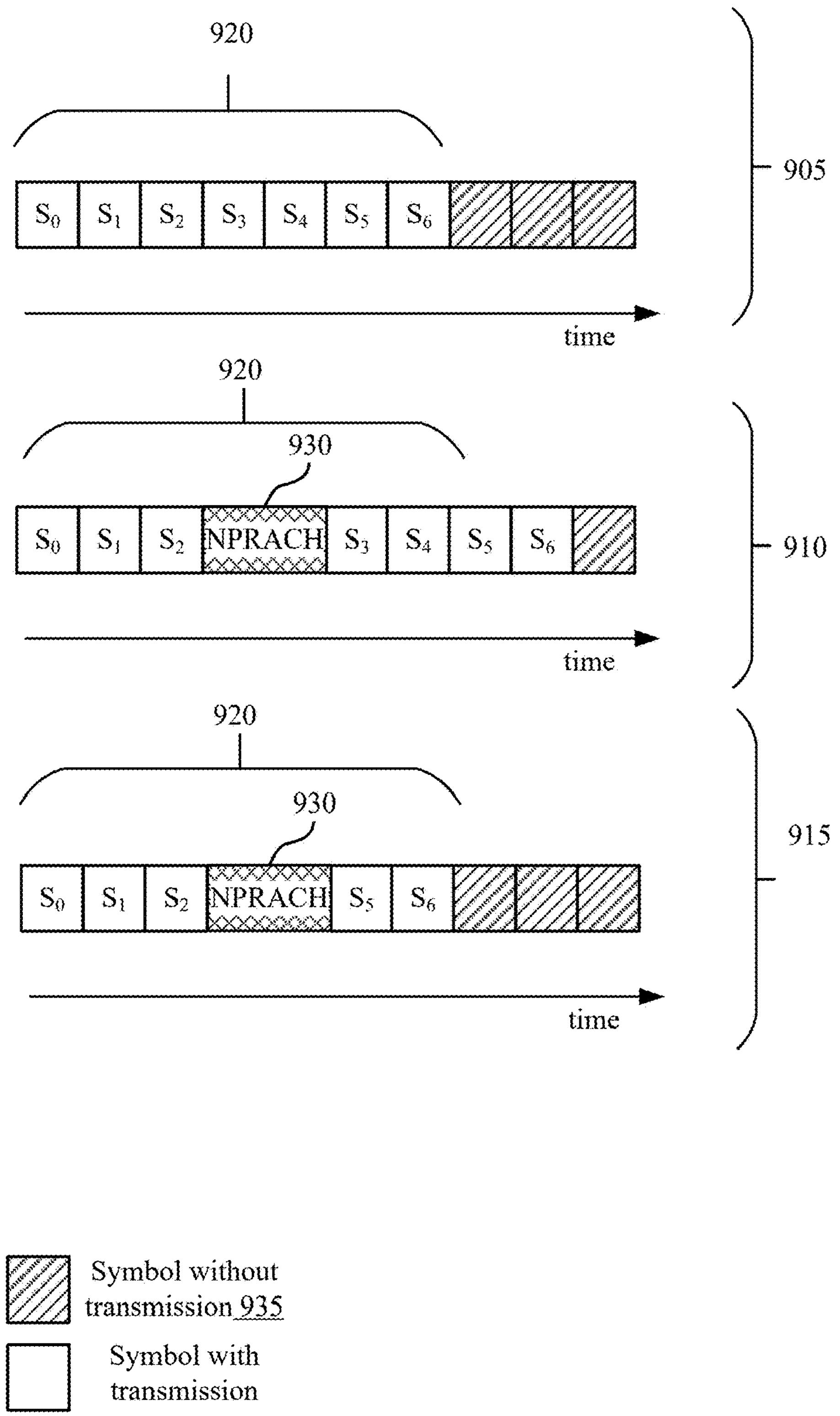
FIG. 9 shows examples of diagrams of transmission timing in a TO that support postponement in contention-based TO groups in accordance with one or more aspects of the present disclosure.

FIG. 9 shows an example of a transmission timing in a TO diagram 905, a transmission timing in a TO diagram 910, and a transmission timing in a TO diagram 915 that support postponement in contention-based TO groups in accordance with one or more aspects of the present disclosure. The transmission timing in a TO diagram 905, the transmission timing in a TO diagram 910, and the transmission timing in a TO diagram 915 may implement or may be implemented by aspects of the wireless communications system 100 or the wireless communications system 200.

As shown FIG. 9, an NPUSCH transmission in a TO 920 may occupy seven symbols ($S_0$, $S_1$, $S_2$, $S_3$, $S_4$, $S_5$, and $S_6$). The TO 920 may occupy seven symbols. In some examples, as shown in the transmission timing in a TO diagram 905, if there is no NPRACH overlapping the TO 920, a UE 115 may complete an NPUSCH within the TO 920 (e.g., using the symbols $S_0$, $S_1$, $S_2$, $S_3$, $S_4$, $S_5$, and $S_6$) and several symbols 935 after the TO 920 may not be used by the UE 115.

In some examples, as shown in the transmission timing in a TO diagram 910 and the transmission timing in a TO diagram 915, an NPRACH 930 may overlap with the TO 920. In some examples, as shown in the transmission timing in a TO diagram 910, the UE 115 may postpone transmission of a portion of the NPUSCH until after the NPRACH 930 (e.g., the UE 115 may transmit in symbols $S_3$, $S_4$, $S_5$, and $S_6$ after the NPRACH 930 and symbols $S_5$ and $S_6$ may extend beyond the nominal end time of the TO 920). In some examples, as shown in the transmission timing in a TO diagram 915, the UE 115 may puncture a portion of the NPUSCH that overlaps with the NPRACH 930 (e.g., may puncture symbols $S_3$, $S_4$ that overlap with the NPRACH 930) in order to keep the start and end times of TOs consistent (e.g., e.g., the UE 115 may transmit in symbols $S_5$ and $S_6$ after the NPRACH 930 and may puncture symbols $S_3$ and $S_4$ of the NPUSCH that overlap the NPRACH 930 to avoid extending transmission beyond the nominal end time of the TO 920).

For example, in some cases, a UE 115 may be required to puncture an EDT transmission instead of postponing the EDT transmission in the case that the EDT transmission overlaps with an NPRACH. Similarly, in some cases, a UE 115 may be required to puncture an EDT transmission instead of postponing the EDT transmission in the case that the EDT transmission overlaps with an uplink gap. In some cases, whether to postpone or puncture may be based on the duration of the NPRACH, the duration of the uplink gap, or the duration of the EDT transmission.

Figure 10:
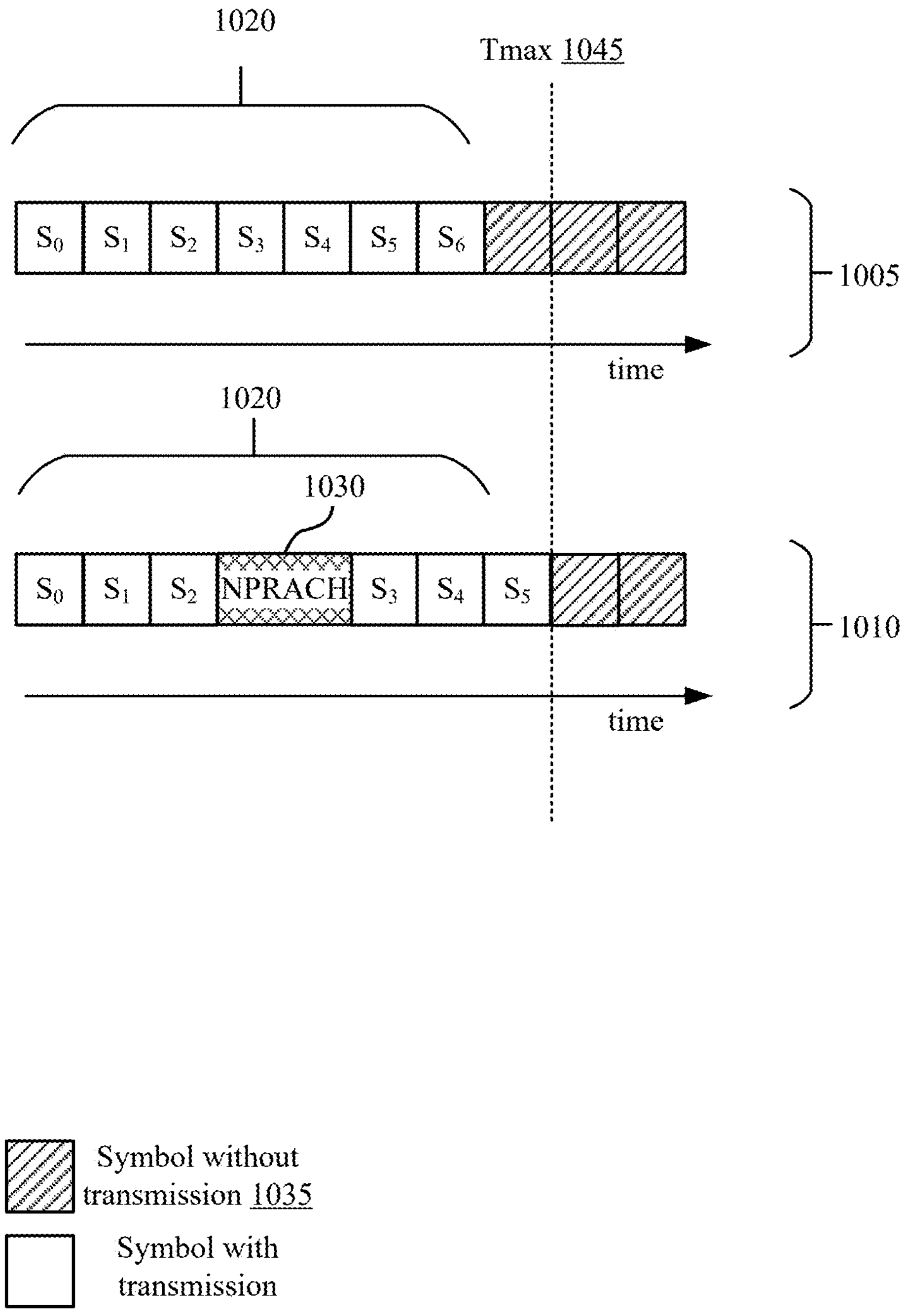
FIG. 10 shows examples of diagrams of transmission timing in a TO that support postponement in contention-based TO groups in accordance with one or more aspects of the present disclosure.

FIG. 10 shows an example of a transmission timing in a TO diagram 1005 and a transmission timing in a TO diagram 1010 that support postponement in contention-based TO groups in accordance with one or more aspects of the present disclosure. The transmission timing in a TO diagram 1005 and the transmission timing in a TO diagram 1010 may implement or may be implemented by aspects of the wireless communications system 100 or the wireless communications system 200.

As shown FIG. 10, an NPUSCH transmission in a TO 1020 may occupy seven symbols ($S_0$, $S_1$, $S_2$, $S_3$, $S_4$, $S_5$, and $S_6$). The TO 1020 may occupy seven symbols. In some examples, as shown in the transmission timing in a TO diagram 1005, if there is no NPRACH overlapping the TO 1020, a UE 115 may complete an NPUSCH within the TO 1020 (e.g., using the symbols $S_0$, $S_1$, $S_2$, $S_3$, $S_4$, $S_5$, and $S_6$) and several symbols 1035 after the TO 1020 may not be used by the UE 115.

In some examples, as shown in the transmission timing in a TO diagram 1010, an NPRACH 1030 may overlap with the TO 1020. In some examples, as shown in the transmission timing in a TO diagram 1010, the UE 115 may postpone transmission of a portion of the NPUSCH until after the NPRACH 1030 (e.g., the UE 115 may transmit in symbols $S_3$, $S_4$, and $S_5$ after the NPRACH 1030 and symbol $S_5$ may extend beyond the nominal end time of the TO 1020). In some examples, the UE 115 may truncate the portion of the transmission that extends beyond a maximum transmission time 1045 ($T_{max,n}$). For example, as shown in the transmission timing in a TO diagram 1005, the UE 115 may puncture the symbol $S_6$ which extends beyond the maximum transmission time 1045. In some examples, the maximum transmission time, $T_{max,n}$, may be defined as the nominal start time of the next TO, the nominal start time of the next TO minus an uplink gap (e.g., 40*30720 $T_s$, or the nominal end time of the TO 1020 plus a fixed offset).

Figure 11:
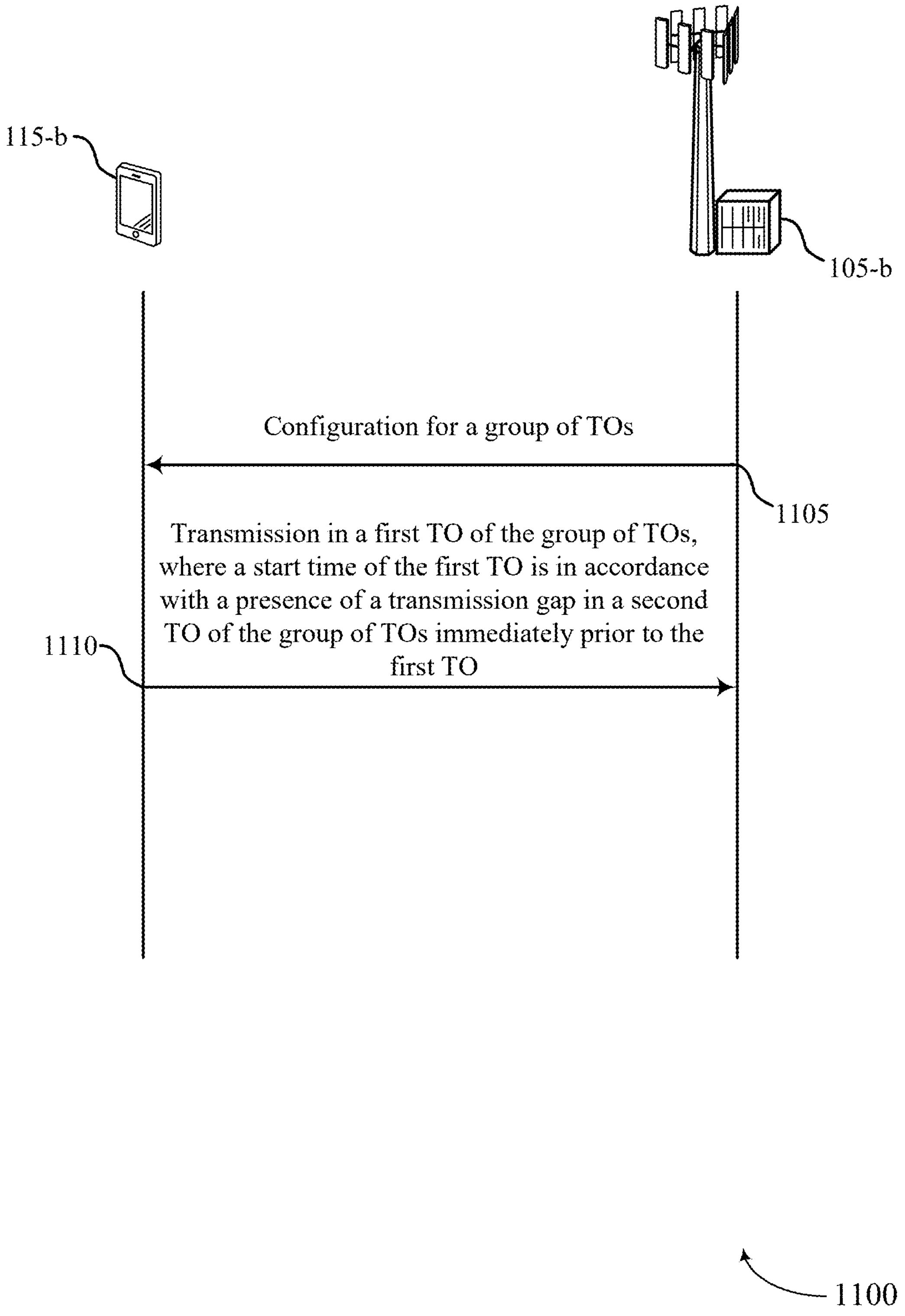
FIG. 11 shows an example of a process flow that supports postponement in contention-based TO groups in accordance with one or more aspects of the present disclosure.

FIG. 11 shows an example of a process flow 1100 that supports postponement in contention-based TO groups in accordance with one or more aspects of the present disclosure. The process flow 1100 may implement or may be implemented by aspects of the wireless communications system 100 or the wireless communications system 200. For example, the process flow 1100 may be implemented by a UE 115 (e.g., a UE 115-*b*) or a network entity 105 (e.g., a network entity 105-*b*), which may be examples of the corresponding devices as described with reference to FIGS. 1 and 2.

In the following description of the process flow 1100, the operations between the UE 115-*b* and the network entity 105-*b* may occur in a different order than the example order shown and, in some examples, may be performed by one or more different devices other than those shown as examples. Some operations also may be omitted from the process flow 1100, and other operations may be added to the process flow 1100. Further, although some operations or signaling may be shown to occur at different times for discussion purposes, these operations may actually occur at the same time.

At 1105, the UE 115-*b* may receive, from the network entity 105-*b*, a configuration for a group of TOs that includes two or more TOs. Each TO in the group of TOs may include set of resources shared by a set of multiple UEs 115 for contention-based data or access signal transmissions.

At 1110, the UE 115-*b* may perform a data or access signal transmission in a first resource of the set of resources and a first TO of the group of TOs. A start time of the first TO may be in accordance with a presence of a transmission gap in a second TO of the group of TOs, the second TO immediately prior to the first TO within the group of TOs.

In some examples, the UE 115-*b* may receive, from the network entity, an indication of a periodicity (e.g., $T_p$) for respective start times of the two or more TOs. The periodicity may be in accordance with the presence of the transmission gap in the second TO. For example, the indication may be provided via a SIB or other control signaling. For example, $T_p$ may be set to be large enough to account for the transmission gap in the second TO such that transmissions in the second TO end before the start time of the first TO with postponement of the transmissions in the second TO caused by the presence of the transmission gap.

In some examples, the UE 115-*b* may receive, from the network entity 105-*b*, an indication of a first start time of a temporally first TO of the group of TOs and an indication of respective offsets between respective start times of each subsequent TO of the group of TOs, and the start time of the first TO may be in accordance with the presence of the transmission gap based on the respective offset between the respective start time of the second TO and the start time. For example, the indication may be provided via a SIB or other control signaling. In some examples, the respective offsets may be TO specific (e.g., within the same group, the respective offsets may be different). In some example, the respective offsets may be group-specific (e.g., within the same TO group, the same offsets may be used, but different groups of TOs may use different offsets). In some examples, the respective offsets may be common for all groups of TOs. For example, in an example where respective offsets are common for all groups but TO specific within a TO group, the TO group start time may be every 100 ms, the second sequential TO in the group may start 30 ms after the start time of the first sequential TO in the group (e.g., the first respective offset may be 30 ms), and the third sequential TO in the group may start 20 ms after the start time of the second sequential TO in the group (e.g., the second respective offset may be 20 ms). In such an example, the grouping of TOs may be (0 ms, 30 ms, 50 ms), (100 ms, 130 ms, 150 ms), . . . . As another example, in an example where the respective offsets are common for all TOs in a group but TO group specific, the TO group start time may be every 100 ms, the next TO in group one may start 20 ms after the previous one, and the next TO in group two may start 30 ms after the previous one. In such an example, the grouping of TOs may be (0 ms, 20 ms, 40 ms), (100 ms, 130 ms, 160 ms). In some examples, applying the same offset to TOs within a group, or across groups may reduce signaling overhead.

In some examples, UE 115-*b* may receive, from the network entity 105-*b*, an indication of a first start time of a temporally first TO of the group of TOs and an indication of respective offsets between respective nominal end times and respective start times of each subsequent TO of the group of TOs, and the start time of the first TO may be in accordance with the presence of the transmission gap based on the respective offset between the respective nominal end time of the second TO and the start time. For example, the indication may be provided via a SIB or other control signaling. In some examples, the UE 115-*b* may receive, from the network entity 105-*b* (e.g., via a SIB or other control signaling) an indication of a nominal duration for the two or more TOs. The respective nominal end times may be in accordance with the first start time and the nominal duration. In some examples, the respective offsets may be TO specific (e.g., within the same group, the respective offsets may be different). In some example, the respective offsets may be group-specific (e.g., within the same TO group, the same offsets may be used, but different groups of TOs may use different offsets). In some examples, the respective offsets may be common for all groups of TOs.

In some examples, the UE 115-*b* may receive, from the network entity 105-*b*, scheduling information for a PRACH resource (e.g., an NPRACH resource) or an uplink gap. For example, the scheduling information may be indicative of the uplink gap based on scheduling a transmission of larger than 256 ms (e.g., by the UE 115-*b* or another UE 115), which may demand an uplink gap within the scheduled transmission. The UE 115-*b* may detect, based on the scheduling information and the configuration, an overlap between the PRACH resource or the uplink gap and one or more resources of the set of resources in the second TO, and the transmission gap may be the overlap. The UE 115-*b* may calculate the start time based on detection of the overlap.

In some examples, the UE 115-*b* may calculate, based on a nominal duration of the two or more TOs, a nominal start time of the first TO. The UE 115-*b* may calculate, based on detection of the transmission gap and based on the configuration, a worst case start time of the first TO. The UE 115-*b* may select the worst case start time as the start time based on the worst case start time being later than the nominal start time. In some examples, to calculate the worst case start time, the UE 115-*b* may add an additional offset (e.g., 40*30720 $T_s$) to a second worst case start time, the second worst case start time based on detection of the transmission gap and based on the configuration.

In some examples, the UE 115-*b* may puncture a portion of the data or access signal transmission during a second transmission gap in the first TO. In some examples, puncturing the portion of the data or access signal transmission during the second transmission gap may be based on a duration of the second transmission gap being less than a threshold duration.

In some examples, the UE 115-*b* may transmit a first portion of the data or access signal transmission prior to a second transmission gap in the first TO, and the UE 115-*b* may transmit a remainder of the data or access signal transmission after the second transmission gap.

In some examples, the UE 115-*b* may: transmit a first portion of the data or access signal transmission prior to a second transmission gap in the first TO; transmit a second portion of the data or access signal transmission after the second transmission gap; and puncture a remainder of the data or access signal transmission that exceeds a maximum TO duration (e.g., the portion that exceeds ($T_{max,n}$). In some examples, the maximum TO duration may be based on a nominal start time of a subsequent TO, an offset or nominal end time of the first TO plus an offset, or a combination thereof.

In some examples, the network entity 105-*b* may transmit responses (e.g., HARQ feedback or random access response messages) for the data or access signal transmissions in the resources of the TOs. In some examples, the responses by the network entity 105-*b* may be separate for each TO. In some examples, the responses from the network entity 105-*b* may be combined for a TO group. Whether the responses are separate per TO or may be combined for a TO group may be configured via a SIB or other control signaling.

In some examples, as described herein, the responses may be separate for each TO. For example, the UE 115-*b* may continue to monitor for a response for each TO in which the UE 115-*b* transmitted within the TO group using separate response window timers for each of the TOs. For example, the UE 115-*b* may monitor a response window for a response message for the data or access signal transmission, and the response window may be associated with the first TO. In some examples, a timing of the response window may be in accordance with the presence of the transmission gap. For example, separate for each TO, the UE 115-*b* may compute the beginning of the response window time for the $n^{th}$ TO by replacing in the computation the end time of the transmission by the UE 115-*b* in the $n^{th}$ TO with the worst case end time of the $n^{th}$ TO.

In some examples, as described herein, the responses may be combined for a TO group. For example, the UE 115-*b* may monitor for the response with windows defined from the end of the TO group (e.g., instead of the end of a TO). In such examples, the UE 115-*b* may use a single response window and/or timer for the TO group. For example, the UE 115-*b* may monitor a response window for a response message for the data or access signal transmission, and the response window may be associated with the group of TOs. In some examples, In some examples, a timing of the response window may be in accordance with the presence of the transmission gap. For example, the UE 115-*b* may compute the beginning of the response window for the TO group by replacing in the computation the end of the TO group with the worst case end time of the last TO in the TO group.

Figure 12:
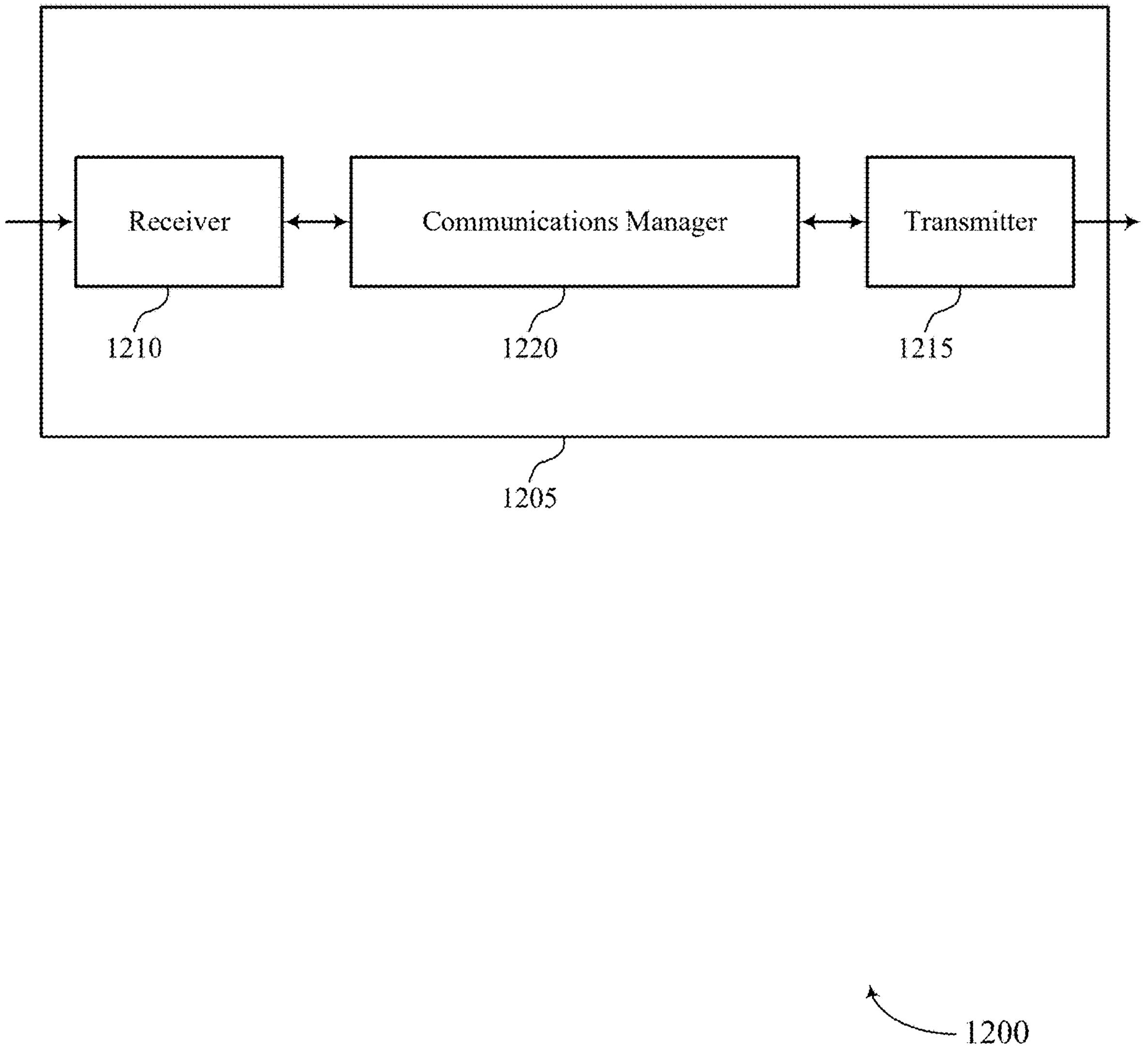
FIGS. 12 and 13 show block diagrams of devices that support postponement in contention-based TO groups in accordance with one or more aspects of the present disclosure.

FIG. 12 shows a block diagram 1200 of a device 1205 that supports postponement in contention-based TO groups in accordance with one or more aspects of the present disclosure. The device 1205 may be an example of aspects of a UE 115 as described herein. The device 1205 may include a receiver 1210, a transmitter 1215, and a communications manager 1220. The device 1205, or one or more components of the device 1205 (e.g., the receiver 1210, the transmitter 1215, the communications manager 1220), may include at least one processor, which may be coupled with at least one memory, to, individually or collectively, support or enable the described techniques. Each of these components may be in communication with one another (e.g., via one or more buses).

The receiver 1210 may provide a means for receiving information such as packets, user data, control information, or any combination thereof associated with various information channels (e.g., control channels, data channels, information channels related to postponement in contention-based TO groups). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to postponement in contention-based TO groups). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations or components thereof may be examples of means for performing various aspects of postponement in contention-based TO groups as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software or firmware) executed by at least one processor (e.g., referred to as a processor-executable code). If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. For example, the communications manager 1220 is capable of, configured to, or operable to support a means for receiving a configuration for a group of TOs including two or more TOs, each TO in the group of TOs including a set of resources shared by a set of multiple UEs for contention-based data or access signal transmissions. The communications manager 1220 is capable of, configured to, or operable to support a means for performing a data or access signal transmission in a first resource of the set of resources and a first TO of the group of TOs, where a start time of the first TO is in accordance with a presence of a transmission gap in a second TO of the group of TOs, the second TO immediately prior to the first TO within the group of TOs.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for more efficient utilization of communication resources.

Figure 13:
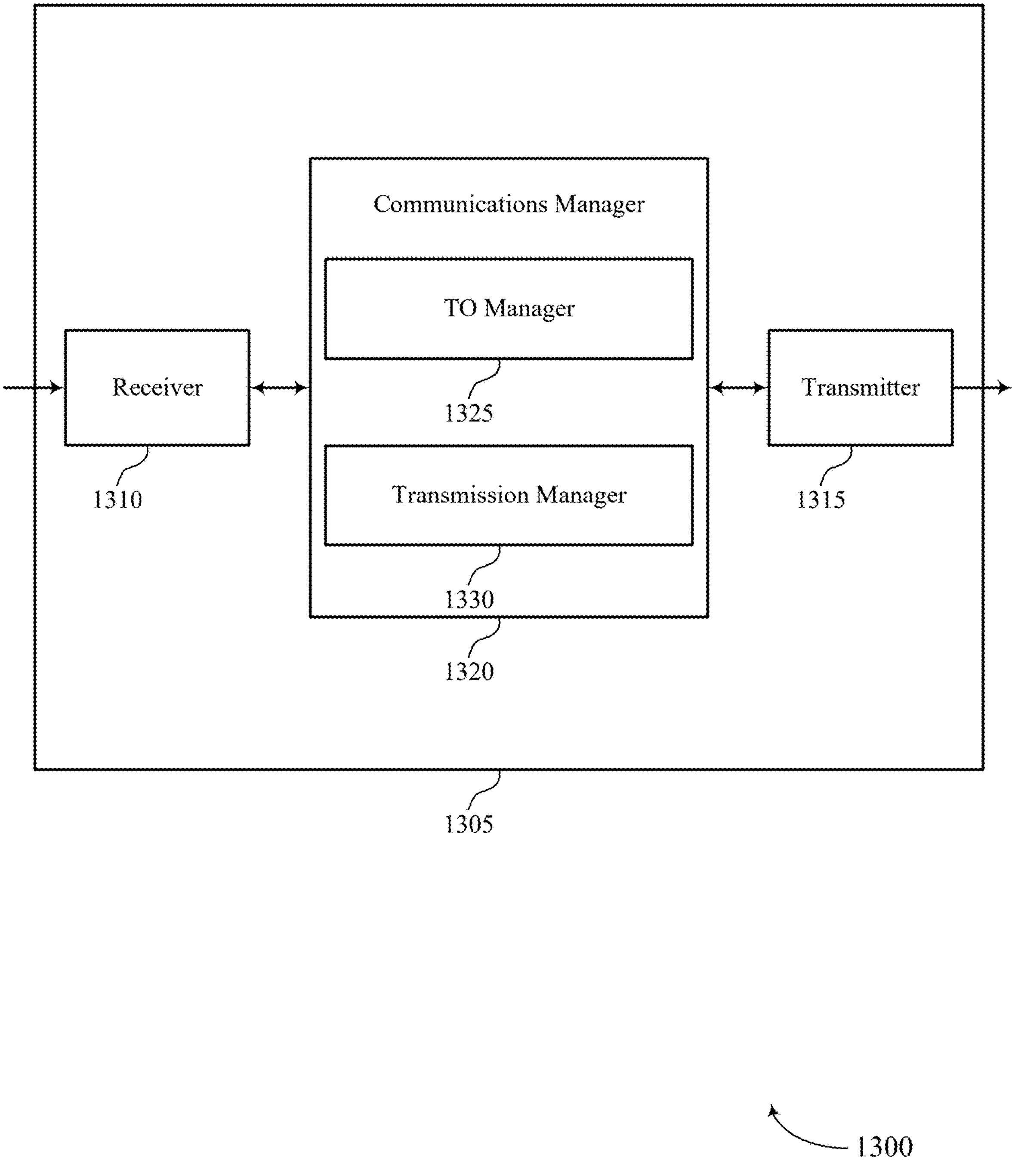

FIG. 13 shows a block diagram 1300 of a device 1305 that supports postponement in contention-based TO groups in accordance with one or more aspects of the present disclosure. The device 1305 may be an example of aspects of a device 1205 or a UE 115 as described herein. The device 1305 may include a receiver 1310, a transmitter 1315, and a communications manager 1320. The device 1305, or one or more components of the device 1305 (e.g., the receiver 1310, the transmitter 1315, the communications manager 1320), may include at least one processor, which may be coupled with at least one memory, to support the described techniques. Each of these components may be in communication with one another (e.g., via one or more buses).

The receiver 1310 may provide a means for receiving information such as packets, user data, control information, or any combination thereof associated with various information channels (e.g., control channels, data channels, information channels related to postponement in contention-based TO groups). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to postponement in contention-based TO groups). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of postponement in contention-based TO groups as described herein. For example, the communications manager 1320 may include a TO manager 1325 a transmission manager 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. The TO manager 1325 is capable of, configured to, or operable to support a means for receiving a configuration for a group of TOs including two or more TOs, each TO in the group of TOs including a set of resources shared by a set of multiple UEs for contention-based data or access signal transmissions. The transmission manager 1330 is capable of, configured to, or operable to support a means for performing a data or access signal transmission in a first resource of the set of resources and a first TO of the group of TOs, where a start time of the first TO is in accordance with a presence of a transmission gap in a second TO of the group of TOs, the second TO immediately prior to the first TO within the group of TOs.

Figure 14:
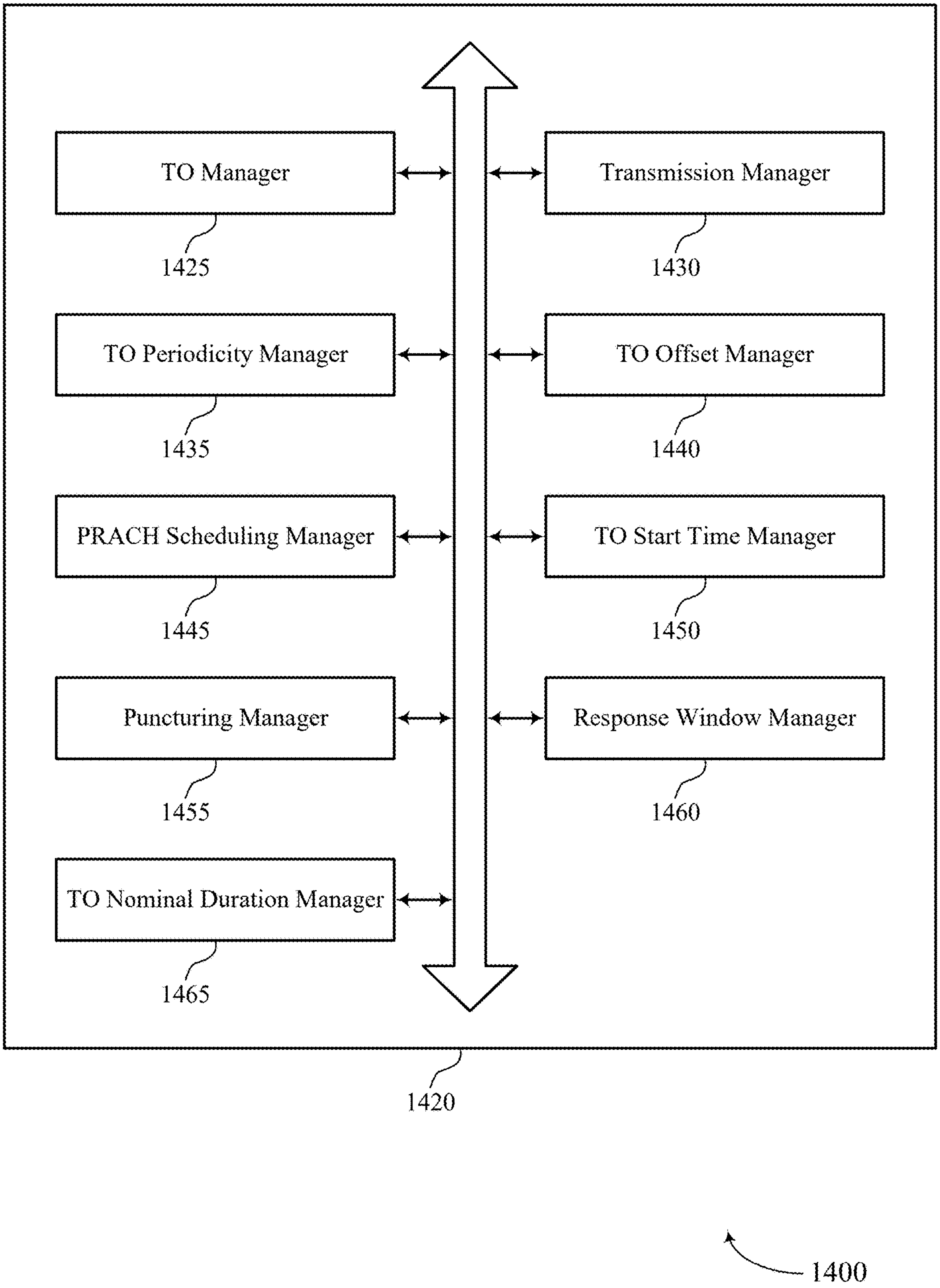
FIG. 14 shows a block diagram of a communications manager that supports postponement in contention-based TO groups in accordance with one or more aspects of the present disclosure.

FIG. 14 shows a block diagram 1400 of a communications manager 1420 that supports postponement in contention-based TO groups in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of postponement in contention-based TO groups as described herein. For example, the communications manager 1420 may include a TO manager 1425, a transmission manager 1430, a TO periodicity manager 1435, a TO offset manager 1440, a PRACH scheduling manager 1445, a TO start time manager 1450, a puncturing manager 1455, a response window manager 1460, a TO nominal duration manager 1465, or any combination thereof. Each of these components, or components or subcomponents thereof (e.g., one or more processors, one or more memories), may communicate, directly or indirectly, with one another (e.g., via one or more buses).

The communications manager 1420 may support wireless communications in accordance with examples as disclosed herein. The TO manager 1425 is capable of, configured to, or operable to support a means for receiving a configuration for a group of TOs including two or more TOs, each TO in the group of TOs including a set of resources shared by a set of multiple UEs for contention-based data or access signal transmissions. The transmission manager 1430 is capable of, configured to, or operable to support a means for performing a data or access signal transmission in a first resource of the set of resources and a first TO of the group of TOs, where a start time of the first TO is in accordance with a presence of a transmission gap in a second TO of the group of TOs, the second TO immediately prior to the first TO within the group of TOs.

In some examples, to support receiving the configuration, the TO periodicity manager 1435 is capable of, configured to, or operable to support a means for receiving an indication of a periodicity for respective start times of the two or more TOs, where the periodicity is in accordance with the presence of the transmission gap in the second TO.

In some examples, to support receiving the configuration, the TO offset manager 1440 is capable of, configured to, or operable to support a means for receiving an indication of a first start time of a temporally first TO of the group of TOs and an indication of respective offsets between respective start times of each subsequent TO of the group of TOs, where the start time of the first TO is in accordance with the presence of the transmission gap based on a respective offset between a respective start time of the second TO and the start time.

In some examples, to support receiving the configuration, the TO offset manager 1440 is capable of, configured to, or operable to support a means for receiving an indication of a first start time of a temporally first TO of the group of TOs and an indication of respective offsets between respective nominal end times and respective start times of each subsequent TO of the group of TOs, where the start time of the first TO is in accordance with the presence of the transmission gap based on a respective offset between a respective nominal end time of the second TO and the start time.

In some examples, to support receiving the configuration, the TO nominal duration manager 1465 is capable of, configured to, or operable to support a means for receiving an indication of a nominal duration for the two or more TOs, where the respective nominal end times are in accordance with the first start time and the nominal duration.

In some examples, the PRACH scheduling manager 1445 is capable of, configured to, or operable to support a means for receiving scheduling information for a PRACH resource or that is indicative of an uplink gap. In some examples, the TO start time manager 1450 is capable of, configured to, or operable to support a means for detecting, based on the scheduling information and the configuration, an overlap between the PRACH resource or the uplink gap and one or more resources of the set of resources in the second TO, where the transmission gap includes the overlap. In some examples, the TO start time manager 1450 is capable of, configured to, or operable to support a means for calculating the start time based on detection of the overlap.

In some examples, the TO start time manager 1450 is capable of, configured to, or operable to support a means for calculating, based on a nominal duration of the two or more TOs, a nominal start time of the first TO. In some examples, the TO start time manager 1450 is capable of, configured to, or operable to support a means for calculating, based on detection of the transmission gap and based on the configuration, a worst case start time of the first TO. In some examples, the TO start time manager 1450 is capable of, configured to, or operable to support a means for selecting the worst case start time as the start time based on the worst case start time being later than the nominal start time.

In some examples, to support calculating the worst case start time, the TO start time manager 1450 is capable of, configured to, or operable to support a means for adding an additional offset to a second worst case start time, the second worst case start time based on detection of the transmission gap and based on the configuration.

In some examples, to support performing the data or access signal transmission, the puncturing manager 1455 is capable of, configured to, or operable to support a means for puncturing a portion of the data or access signal transmission during a second transmission gap in the first TO.

In some examples, puncturing the portion of the data or access signal transmission during the second transmission gap is based on a duration of the second transmission gap being less than a threshold duration.

In some examples, to support performing the data or access signal transmission, the transmission manager 1430 is capable of, configured to, or operable to support a means for transmitting a first portion of the data or access signal transmission prior to a second transmission gap in the first TO. In some examples, to support performing the data or access signal transmission, the transmission manager 1430 is capable of, configured to, or operable to support a means for transmitting a remainder of the data or access signal transmission after the second transmission gap.

In some examples, to support performing the data or access signal transmission, the transmission manager 1430 is capable of, configured to, or operable to support a means for transmitting a first portion of the data or access signal transmission prior to a second transmission gap in the first TO. In some examples, to support performing the data or access signal transmission, the transmission manager 1430 is capable of, configured to, or operable to support a means for transmitting a second portion of the data or access signal transmission after the second transmission gap. In some examples, to support performing the data or access signal transmission, the puncturing manager 1455 is capable of, configured to, or operable to support a means for puncturing a remainder of the data or access signal transmission that exceeds a maximum TO duration.

In some examples, the maximum TO duration is based on a nominal start time of a subsequent TO, an offset or nominal end time of the first TO plus an offset, or a combination thereof.

In some examples, the response window manager 1460 is capable of, configured to, or operable to support a means for monitoring a response window for a response message for the data or access signal transmission, where the response window is associated with the first TO.

In some examples, a timing of the response window is in accordance with the presence of the transmission gap.

In some examples, the response window manager 1460 is capable of, configured to, or operable to support a means for monitoring a response window for a response message for the data or access signal transmission, where the response window is associated with the group of TOs.

In some examples, a timing of the response window is in accordance with the presence of the transmission gap.

Figure 15:
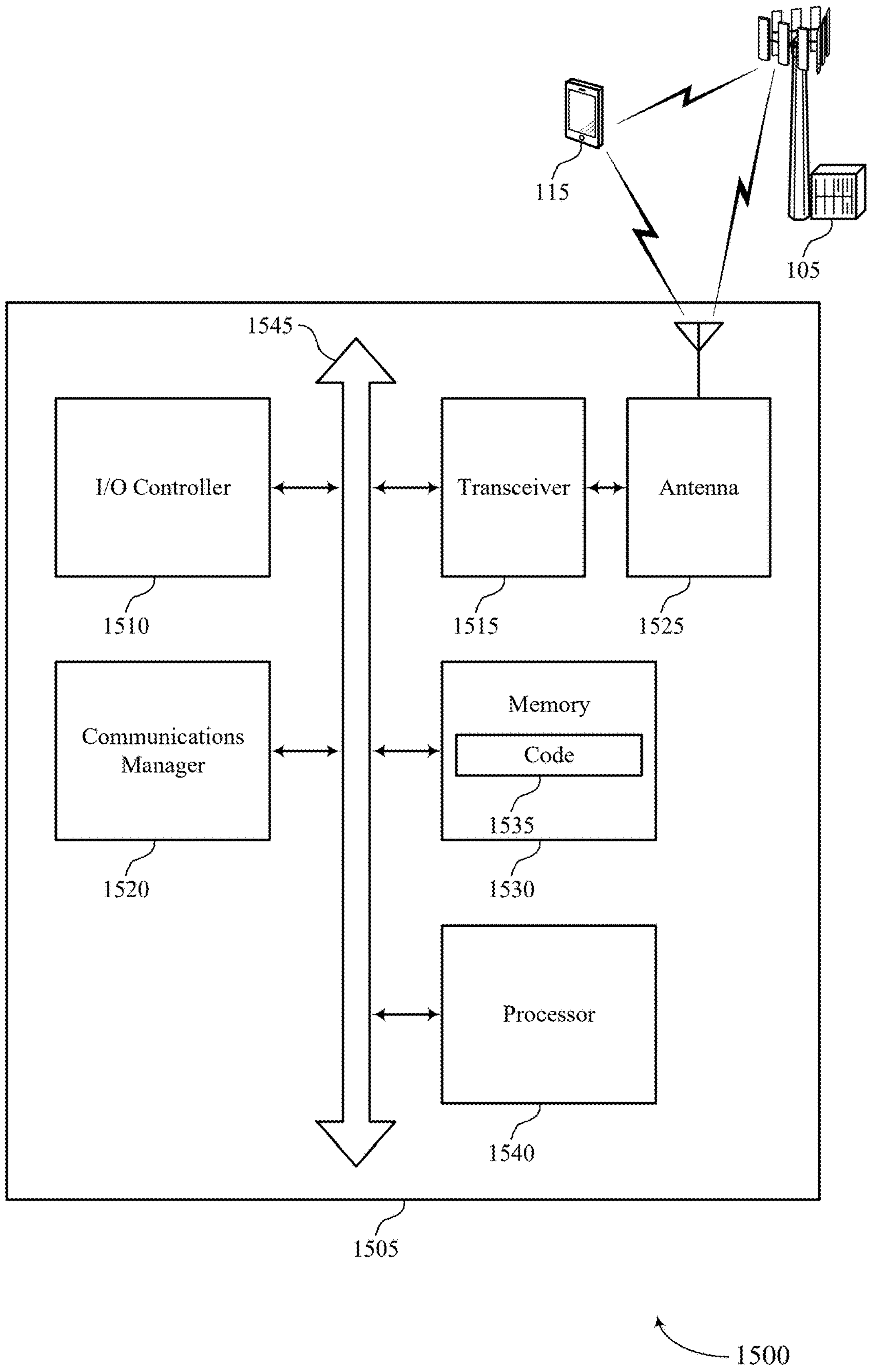
FIG. 15 shows a diagram of a system including a device that supports postponement in contention-based TO groups in accordance with one or more aspects of the present disclosure.

FIG. 15 shows a diagram of a system 1500 including a device 1505 that supports postponement in contention-based TO groups in accordance with one or more aspects of the present disclosure. The device 1505 may be an example of or include components of a device 1205, a device 1305, or a UE 115 as described herein. The device 1505 may communicate (e.g., wirelessly) with one or more other devices (e.g., network entities 105, UEs 115, or a combination thereof). The device 1505 may include components for bi-directional voice and data communications including components for transmitting and receiving communications, such as a communications manager 1520, an input/output (I/O) controller, such as an I/O controller 1510, a transceiver 1515, one or more antennas 1525, at least one memory 1530, code 1535, and at least one processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally, or alternatively, the I/O controller 1510 may represent or interact with a modem, a keyboard, a mouse, a touchscreen, or a similar device. In some cases, the I/O controller 1510 may be implemented as part of one or more processors, such as the at least one processor 1540. In some cases, a user may interact with the device 1505 via the I/O controller 1510 or via hardware components controlled by the I/O controller 1510.

In some cases, the device 1505 may include a single antenna. However, in some other cases, the device 1505 may have more than one antenna, which may be capable of concurrently transmitting or receiving multiple wireless transmissions. The transceiver 1515 may communicate bi-directionally via the one or more antennas 1525 using wired or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The at least one memory 1530 may include random access memory (RAM) and read-only memory (ROM). The at least one memory 1530 may store computer-readable, computer-executable, or processor-executable code, such as the code 1535. The code 1535 may include instructions that, when executed by the at least one processor 1540, cause the device 1505 to perform various functions described herein. The code 1535 may be stored in a non-transitory computer-readable medium such as system memory or another type of memory. In some cases, the code 1535 may not be directly executable by the at least one processor 1540 but may cause a computer (e.g., when compiled and executed) to perform functions described herein. In some cases, the at least one memory 1530 may include, among other things, a basic I/O system (BIOS) which may control basic hardware or software operation such as the interaction with peripheral components or devices.

The at least one processor 1540 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1540 may be configured to operate a memory array using a memory controller. In some other cases, a memory controller may be integrated into the at least one processor 1540. The at least one processor 1540 may be configured to execute computer-readable instructions stored in a memory (e.g., the at least one memory 1530) to cause the device 1505 to perform various functions (e.g., functions or tasks supporting postponement in contention-based TO groups). For example, the device 1505 or a component of the device 1505 may include at least one processor 1540 and at least one memory 1530 coupled with or to the at least one processor 1540, the at least one processor 1540 and the at least one memory 1530 configured to perform various functions described herein.

In some examples, the at least one processor 1540 may include multiple processors and the at least one memory 1530 may include multiple memories. One or more of the multiple processors may be coupled with one or more of the multiple memories, which may, individually or collectively, be configured to perform various functions described herein. In some examples, the at least one processor 1540 may be a component of a processing system, which may refer to a system (such as a series) of machines, circuitry (including, for example, one or both of processor circuitry (which may include the at least one processor 1540) and memory circuitry (which may include the at least one memory 1530)), or components, that receives or obtains inputs and processes the inputs to produce, generate, or obtain a set of outputs. The processing system may be configured to perform one or more of the functions described herein. For example, the at least one processor 1540 or a processing system including the at least one processor 1540 may be configured to, configurable to, or operable to cause the device 1505 to perform one or more of the functions described herein. Further, as described herein, being "configured to," being "configurable to," and being "operable to" may be used interchangeably and may be associated with a capability, when executing code 1535 (e.g., processor-executable code) stored in the at least one memory 1530 or otherwise, to perform one or more of the functions described herein.

The communications manager 1520 may support wireless communications in accordance with examples as disclosed herein. For example, the communications manager 1520 is capable of, configured to, or operable to support a means for receiving a configuration for a group of TOs including two or more TOs, each TO in the group of TOs including a set of resources shared by a set of multiple UEs for contention-based data or access signal transmissions. The communications manager 1520 is capable of, configured to, or operable to support a means for performing a data or access signal transmission in a first resource of the set of resources and a first TO of the group of TOs, where a start time of the first TO is in accordance with a presence of a transmission gap in a second TO of the group of TOs, the second TO immediately prior to the first TO within the group of TOs.

By including or configuring the communications manager 1520 in accordance with examples as described herein, the device 1505 may support techniques for improved communication reliability, reduced latency, more efficient utilization of communication resources, and improved coordination between devices.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the at least one processor 1540, the at least one memory 1530, the code 1535, or any combination thereof. For example, the code 1535 may include instructions executable by the at least one processor 1540 to cause the device 1505 to perform various aspects of postponement in contention-based TO groups as described herein, or the at least one processor 1540 and the at least one memory 1530 may be otherwise configured to, individually or collectively, perform or support such operations.

Figure 16:
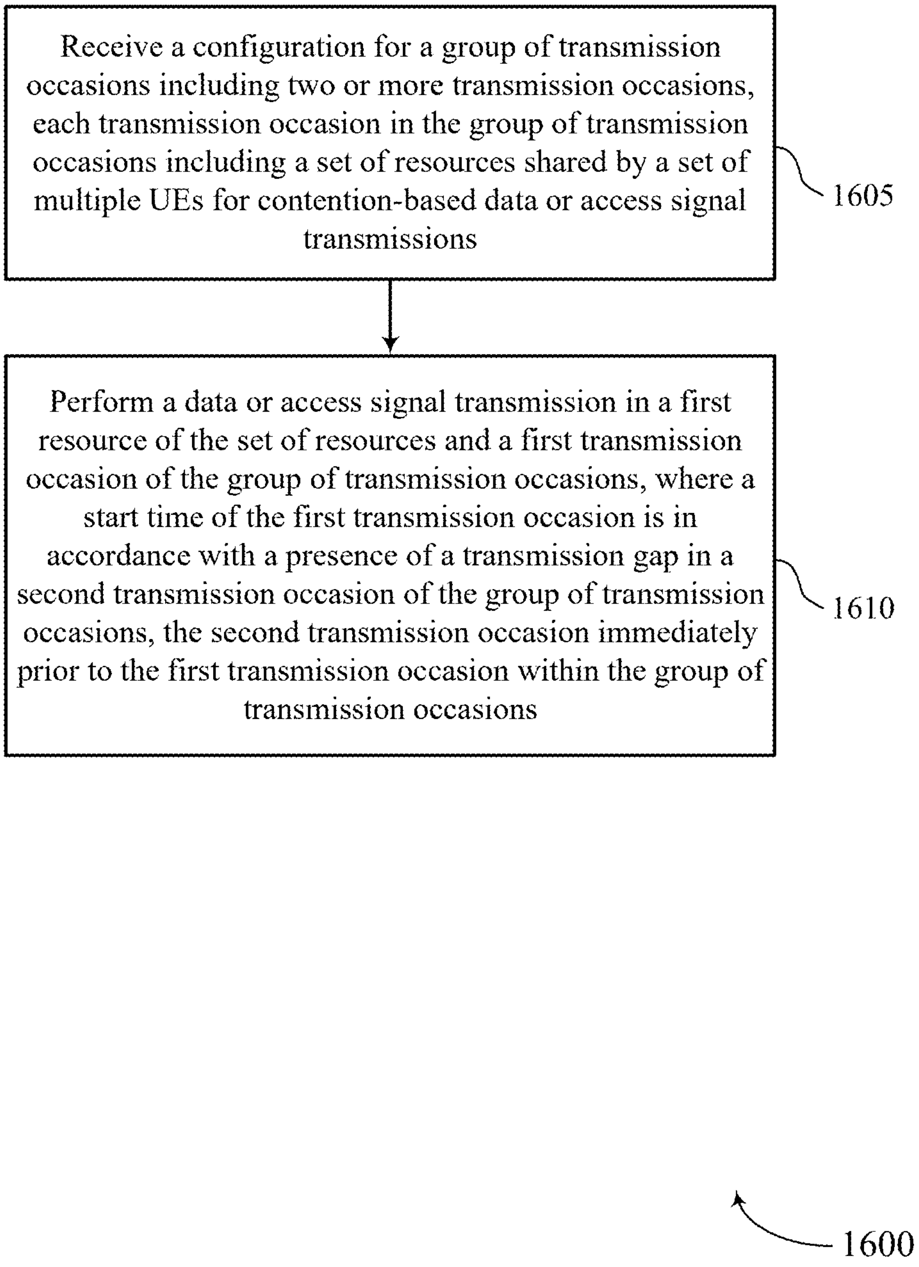
FIG. 16 shows a flowchart illustrating methods that support postponement in contention-based TO groups in accordance with one or more aspects of the present disclosure.

FIG. 16 shows a flowchart illustrating a method 1600 that supports postponement in contention-based TO groups in accordance with one or more aspects of the present disclosure. The operations of the method 1600 may be implemented by a UE or its components as described herein. For example, the operations of the method 1600 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 1605, the method may include receiving a configuration for a group of TOs including two or more TOs, each TO in the group of TOs including a set of resources shared by a set of multiple UEs for contention-based data or access signal transmissions. The operations of 1605 may be performed in accordance with examples as disclosed herein. In some examples, aspects of the operations of 1605 may be performed by a TO manager 1425 as described with reference to FIG. 14.

At 1610, the method may include performing a data or access signal transmission in a first resource of the set of resources and a first TO of the group of TOs, where a start time of the first TO is in accordance with a presence of a transmission gap in a second TO of the group of TOs, the second TO immediately prior to the first TO within the group of TOs. The operations of 1610 may be performed in accordance with examples as disclosed herein. In some examples, aspects of the operations of 1610 may be performed by a transmission manager 1430 as described with reference to FIG. 14.

The following provides an overview of aspects of the present disclosure:

Aspect 1: A method for wireless communications at a UE, comprising: receiving a configuration for a group of TOs comprising two or more TOs, each TO in the group of TOs comprising a set of resources shared by a plurality of UEs for contention-based data or access signal transmissions; and performing a data or access signal transmission in a first resource of the set of resources and a first transmission occasion of the group of TOs, wherein a start time of the first TO is in accordance with a presence of a transmission gap in a second TO of the group of TOs, the second TO immediately prior to the first TO within the group of TOs.

Aspect 2: The method of aspect 1, wherein receiving the configuration comprises: receiving an indication of a periodicity for respective start times of the two or more TOs, wherein the periodicity is in accordance with the presence of the transmission gap in the second TO.

Aspect 3: The method of any of aspects 1 through 2, wherein receiving the configuration comprises: receiving an indication of a first start time of a temporally first TO of the group of TOs and an indication of respective offsets between respective start times of each subsequent TO of the group of TOs, wherein the start time of the first TO is in accordance with the presence of the transmission gap based at least in part on a respective offset between a respective start time of the second TO and the start time.

Aspect 4: The method of any of aspects 1 through 2, wherein receiving the configuration comprises: receiving an indication of a first start time of a temporally first TO of the group of TOs and an indication of respective offsets between respective nominal end times and respective start times of each subsequent TO of the group of TOs, wherein the start time of the first TO is in accordance with the presence of the transmission gap based at least in part on a respective offset between a respective nominal end time of the second TO and the start time.

Aspect 5: The method of aspect 4, wherein receiving the configuration comprises: receiving an indication of a nominal duration for the two or more TOs, wherein the respective nominal end times are in accordance with the first start time and the nominal duration.

Aspect 6: The method of any of aspects 1 through 5, further comprising: receiving scheduling information for a PRACH resource or that is indicative of an uplink gap; detecting, based at least in part on the scheduling information and the configuration, an overlap between the PRACH or the uplink gap and one or more resources of the set of resources in the second TO, wherein the transmission gap comprises the overlap; and calculating the start time based at least in part on detection of the overlap.

Aspect 7: The method of any of aspects 1 through 6, further comprising: calculating, based on a nominal duration of the two or more TOs, a nominal start time of the first TO; calculating, based at least in part on detection of the transmission gap and based at least in part on the configuration, a worst case start time of the first TO; and selecting the worst case start time as the start time based at least in part on the worst case start time being later than the nominal start time.

Aspect 8: The method of aspect 7, wherein calculating the worst case start time further comprises: adding an additional offset to a second worst case start time, the second worst case start time based at least in part on detection of the transmission gap and based at least in part on the configuration.

Aspect 9: The method of any of aspects 1 through 8, wherein performing the data or access signal transmission comprises: puncturing a portion of the data or access signal transmission during a second transmission gap in the first TO.

Aspect 10: The method of aspect 9, wherein puncturing the portion of the data or access signal transmission during the second transmission gap is based at least in part on a duration of the second transmission gap being less than a threshold duration.

Aspect 11: The method of any of aspects 1 through 10, wherein performing the data or access signal transmission comprises: transmitting a first portion of the data or access signal transmission prior to a second transmission gap in the first TO; and transmitting a remainder of the data or access signal transmission after the second transmission gap.

Aspect 12: The method of any of aspects 1 through 11, wherein performing the data or access signal transmission comprises: transmitting a first portion of the data or access signal transmission prior to a second transmission gap in the first TO; transmitting a second portion of the data or access signal transmission after the second transmission gap; and puncturing a remainder of the data or access signal transmission that exceeds a maximum TO duration.

Aspect 13: The method of aspect 12, wherein the maximum TO duration is based at least in part on a nominal start time of a subsequent TO, an offset or nominal end time of the first TO plus an offset, or a combination thereof.

Aspect 14: The method of any of aspects 1 through 13, further comprising: monitoring a response window for a response message for the data or access signal transmission, wherein the response window is associated with the first TO.

Aspect 15: The method of aspect 14, wherein a timing of the response window is in accordance with the presence of the transmission gap.

Aspect 16: The method of any of aspects 1 through 13, further comprising: monitoring a response window for a response message for the data or access signal transmission, wherein the response window is associated with the group of TOs.

Aspect 17: The method of aspect 16, wherein a timing of the response window is in accordance with the presence of the transmission gap.

Aspect 18: A UE for wireless communications, comprising one or more memories storing processor-executable code, and one or more processors coupled with the one or more memories and individually or collectively operable to execute the code to cause the UE to perform a method of any of aspects 1 through 17.

Aspect 19: A UE for wireless communications, comprising at least one means for performing a method of any of aspects 1 through 17.

Aspect 20: A non-transitory computer-readable medium storing code for wireless communications, the code comprising instructions executable by one or more processors to perform a method of any of aspects 1 through 17.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
- one or more memories storing processor-executable code; and
- one or more processors coupled with the one or more memories and individually or collectively operable to execute the code to cause the UE to:
  - receive a configuration for a group of transmission occasions comprising two or more transmission occasions, each transmission occasion in the group of transmission occasions comprising a set of resources shared by a plurality of UEs for contention-based data or access signal transmissions; and
  - perform a data or access signal transmission in a first resource of the set of resources and a first transmission occasion of the group of transmission occasions, wherein a start time of the first transmission occasion is in accordance with a presence of a transmission gap in a second transmission occasion of the group of transmission occasions, the second transmission occasion occurring before the first transmission occasion within the group of transmission occasions.

2. The UE of claim 1, wherein, to receive the configuration, the one or more processors are individually or collectively operable to execute the code to cause the UE to:
- receive an indication of a periodicity for respective start times of the two or more transmission occasions, wherein the periodicity is in accordance with the presence of the transmission gap in the second transmission occasion.

3. The UE of claim 1, wherein, to receive the configuration, the one or more processors are individually or collectively operable to execute the code to cause the UE to:
- receive an indication of a first start time of a temporally first transmission occasion of the group of transmission occasions and an indication of respective offsets between respective start times of each subsequent transmission occasion of the group of transmission occasions, wherein the start time of the first transmission occasion is in accordance with the presence of the transmission gap based at least in part on a respective offset between a respective start time of the second transmission occasion and the start time.

4. The UE of claim 1, wherein, to receive the configuration, the one or more processors are individually or collectively operable to execute the code to cause the UE to:

receive an indication of a first start time of a temporally first transmission occasion of the group of transmission occasions and an indication of respective offsets between respective nominal end times and respective start times of each subsequent transmission occasion of the group of transmission occasions, wherein the start time of the first transmission occasion is in accordance with the presence of the transmission gap based at least in part on a respective offset between a respective nominal end time of the second transmission occasion and the start time.

5. The UE of claim 4, wherein, to receive the configuration, the one or more processors are individually or collectively operable to execute the code to cause the UE to:

receive an indication of a nominal duration for the two or more transmission occasions, wherein the respective nominal end times are in accordance with the first start time and the nominal duration.

6. The UE of claim 1, wherein the one or more processors are individually or collectively further operable to execute the code to cause the UE to:

receive scheduling information for a physical random access channel resource or that is indicative of an uplink gap;

detect, based at least in part on the scheduling information and the configuration, an overlap between the physical random access channel resource or the uplink gap and one or more resources of the set of resources in the second transmission occasion, wherein the transmission gap comprises the overlap; and calculate the start time based at least in part on detection of the overlap.

7. The UE of claim 1, wherein the one or more processors are individually or collectively further operable to execute the code to cause the UE to:

calculate, based at least in part on a nominal duration of the two or more transmission occasions, a nominal start time of the first transmission occasion;

calculate, based at least in part on detection of the transmission gap and based at least in part on the configuration, a worst case start time of the first transmission occasion; and select the worst case start time as the start time based at least in part on the worst case start time being later than the nominal start time.

8. The UE of claim 7, wherein, to calculate the worst case start time, the one or more processors are individually or collectively further operable to execute the code to cause the UE to:

add an additional offset to a second worst case start time, the second worst case start time based at least in part on detection of the transmission gap and based at least in part on the configuration.

9. The UE of claim 1, wherein, to perform the data or access signal transmission, the one or more processors are individually or collectively operable to execute the code to cause the UE to:

puncture a portion of the data or access signal transmission during a second transmission gap in the first transmission occasion.

10. The UE of claim 9, wherein puncturing the portion of the data or access signal transmission during the second transmission gap is based at least in part on a duration of the second transmission gap being less than a threshold duration.

11. The UE of claim 1, wherein, to perform the data or access signal transmission, the one or more processors are individually or collectively operable to execute the code to cause the UE to:

transmit a first portion of the data or access signal transmission prior to a second transmission gap in the first transmission occasion; and transmit a remainder of the data or access signal transmission after the second transmission gap.

12. The UE of claim 1, wherein, to perform the data or access signal transmission, the one or more processors are individually or collectively operable to execute the code to cause the UE to:

transmit a first portion of the data or access signal transmission prior to a second transmission gap in the first transmission occasion;

transmit a second portion of the data or access signal transmission after the second transmission gap; and puncture a remainder of the data or access signal transmission that exceeds a maximum transmission occasion duration.

13. The UE of claim 12, wherein the maximum transmission occasion duration is based at least in part on a nominal start time of a subsequent transmission occasion, an offset or nominal end time of the first transmission occasion plus an offset, or a combination thereof.

14. The UE of claim 1, wherein the one or more processors are individually or collectively further operable to execute the code to cause the UE to:

monitor a response window for a response message for the data or access signal transmission, wherein the response window is associated with the first transmission occasion.

15. The UE of claim 14, wherein a timing of the response window is in accordance with the presence of the transmission gap.

16. The UE of claim 1, wherein the one or more processors are individually or collectively further operable to execute the code to cause the UE to:

monitor a response window for a response message for the data or access signal transmission, wherein the response window is associated with the group of transmission occasions.

17. The UE of claim 16, wherein a timing of the response window is in accordance with the presence of the transmission gap.

18. A method for wireless communications at a user equipment (UE), comprising:

receiving a configuration for a group of transmission occasions comprising two or more transmission occasions, each transmission occasion in the group of transmission occasions comprising a set of resources shared by a plurality of UEs for contention-based data or access signal transmissions; and performing a data or access signal transmission in a first resource of the set of resources and a first transmission occasion of the group of transmission occasions, wherein a start time of the first transmission occasion is in accordance with a presence of a transmission gap in a second transmission occasion of the group of transmission occasions, the second transmission occasion occurring before the first transmission occasion within the group of transmission occasions.

19. The method of claim 18, wherein receiving the configuration comprises:

receiving an indication of a periodicity for respective start times of the two or more transmission occasions, wherein the periodicity is in accordance with the presence of the transmission gap in the second transmission occasion.

20. A non-transitory computer-readable medium storing code for wireless communications, the code comprising instructions executable by one or more processors to:

receive a configuration for a group of transmission occasions comprising two or more transmission occasions, each transmission occasion in the group of transmission occasions comprising a set of resources shared by a plurality of UEs for contention-based data or access signal transmissions; and perform a data or access signal transmission in a first resource of the set of resources and a first transmission occasion of the group of transmission occasions, wherein a start time of the first transmission occasion is in accordance with a presence of a transmission gap in a second transmission occasion of the group of transmission occasions, the second transmission occasion occurring before the first transmission occasion within the group of transmission occasions.

* * * * *